(12) United States Patent
Jerschow et al.

(10) Patent No.: US 12,529,725 B2
(45) Date of Patent: Jan. 20, 2026

(54) SYSTEMS AND METHODS FOR MAGNETIC SUSCEPTOMETRY OF DEVICES WITH MAGNETOMETRY

(71) Applicant: NEW YORK UNIVERSITY, New York, NY (US)

(72) Inventors: Alexej Jerschow, New York, NY (US); Mohaddese Mohammadi, Brooklyn, NY (US); Emilia Silletta, Cordoba (AR); Dmitry Budker, Mainz (DE); Geoffrey Z. Iwata, Mainz (DE); Yinan Hu, Mainz (DE); Arne Wickenbrock, Mainz (DE); John Blanchard, Mainz (DE)

(73) Assignee: NEW YORK UNIVERSITY, New York, NY (US)

( * ) Notice: Subject to any disclaimer, the term of this patent is extended or adjusted under 35 U.S.C. 154(b) by 111 days.

(21) Appl. No.: 17/605,406

(22) PCT Filed: Apr. 23, 2020

(86) PCT No.: PCT/US2020/029524
§ 371 (c)(1),
(2) Date: Oct. 21, 2021

(87) PCT Pub. No.: WO2020/219677
PCT Pub. Date: Oct. 29, 2020

(65) Prior Publication Data
US 2022/0229119 A1    Jul. 21, 2022

Related U.S. Application Data

(60) Provisional application No. 62/838,909, filed on Apr. 25, 2019.

(51) Int. Cl.
*G01R 31/382* (2019.01)
*G01R 33/00* (2006.01)
*G01R 33/16* (2006.01)

(52) U.S. Cl.
CPC ....... *G01R 31/382* (2019.01); *G01R 33/0076* (2013.01); *G01R 33/0094* (2013.01); *G01R 33/16* (2013.01)

(58) Field of Classification Search
CPC .............. G01R 31/382; G01R 33/0076; G01R 33/0094; G01R 33/16; G01R 33/02; G01R 33/022
See application file for complete search history.

(56) References Cited

U.S. PATENT DOCUMENTS

2002/0077537 A1*  6/2002  Avrin .............. A61B 5/242
                                        600/408
2003/0160614 A1*  8/2003  Morita ............ G01R 33/34069
                                        324/318

(Continued)

FOREIGN PATENT DOCUMENTS

DE    2703830    *  3/2014    ........... G01R 31/382
EP    2 703 830       3/2014

OTHER PUBLICATIONS

Andrew J. Ilott, et al., Rechargeable lithium-ion cell state of charge and defect detection by in-situ inside-out magnetic resonance imaging (Year: 2018).*

(Continued)

*Primary Examiner* — Alvaro E Fortich
(74) *Attorney, Agent, or Firm* — Foley & Lardner LLP

(57) ABSTRACT

A method of diagnosing internal characteristics of a device includes applying a strong magnetic field to the device. The method can include reducing the strong magnetic field at a location of one or more sensors. At least one of the one or more sensors is proximate to the device. The method can (Continued)

include measuring induced magnetic fields around the device. The method can include measuring induced or intrinsic electrical current flow. The method can include measuring intrinsic magnetic properties. The induced magnetic fields can include diagnostic information on properties of the device and how the properties change over time. The device may be, for example, a battery, a capacitor, a supercapacitor, or a fuel cell. The presented measurement of magnetic susceptibility can be performed on materials, solutions, chemical substances, or tissue samples.

20 Claims, 15 Drawing Sheets

(56) References Cited

U.S. PATENT DOCUMENTS

| | | | | |
|---|---|---|---|---|
| 2004/0155626 | A1* | 8/2004 | Hedegor | B07C 5/344 |
| | | | | 320/116 |
| 2008/0211492 | A1* | 9/2008 | Tsukada | G01R 33/063 |
| | | | | 324/234 |
| 2010/0201357 | A1* | 8/2010 | Ogawa | G01R 33/56341 |
| | | | | 324/301 |
| 2012/0194198 | A1* | 8/2012 | Moran | G01R 31/382 |
| | | | | 324/201 |
| 2016/0109534 | A1* | 4/2016 | Dieny | G01R 35/005 |
| | | | | 324/252 |
| 2017/0023653 | A1* | 1/2017 | Kobayashi | G01R 33/26 |
| 2017/0200994 | A1* | 7/2017 | Kim | H01M 10/625 |
| 2018/0052123 | A1* | 2/2018 | Jerschow | G01R 33/5608 |
| 2020/0194198 | A1 | 6/2020 | Chan et al. | |

OTHER PUBLICATIONS

Emma Olsson et al., MRI-Based Quantification of Magnetic Susceptibility in Gel Phantoms: Assessment of Measurement and Calculation Accuracy (Year: 2018).*
Budker & Romalis, "Optical magnetometry," Nature Physics 3, pp. 227-234 (2007).
Ilott, et al., "Rechargeable lithium-ion cell state of charge and defect detection by in-situ inside-out magnetic resonance imaging," Nature Communications 9, 1779, 7 pages (2018).
International Search Report and Written Opinion for PCT Application No. PCT/US2020/029524, dated Sep. 11, 2020.
Taylor, et al., "High-sensitivity diamond magnetometer with nanoscale resolution," Nature Physics 4, pp. 810-816 (2008).
Xu, et al., "Construction and applications of an atomic magnetic gradiometer based on nonlinear magneto-optical rotation," Review of Scientific Instruments 77, 083106, 8 pages (2006).

* cited by examiner

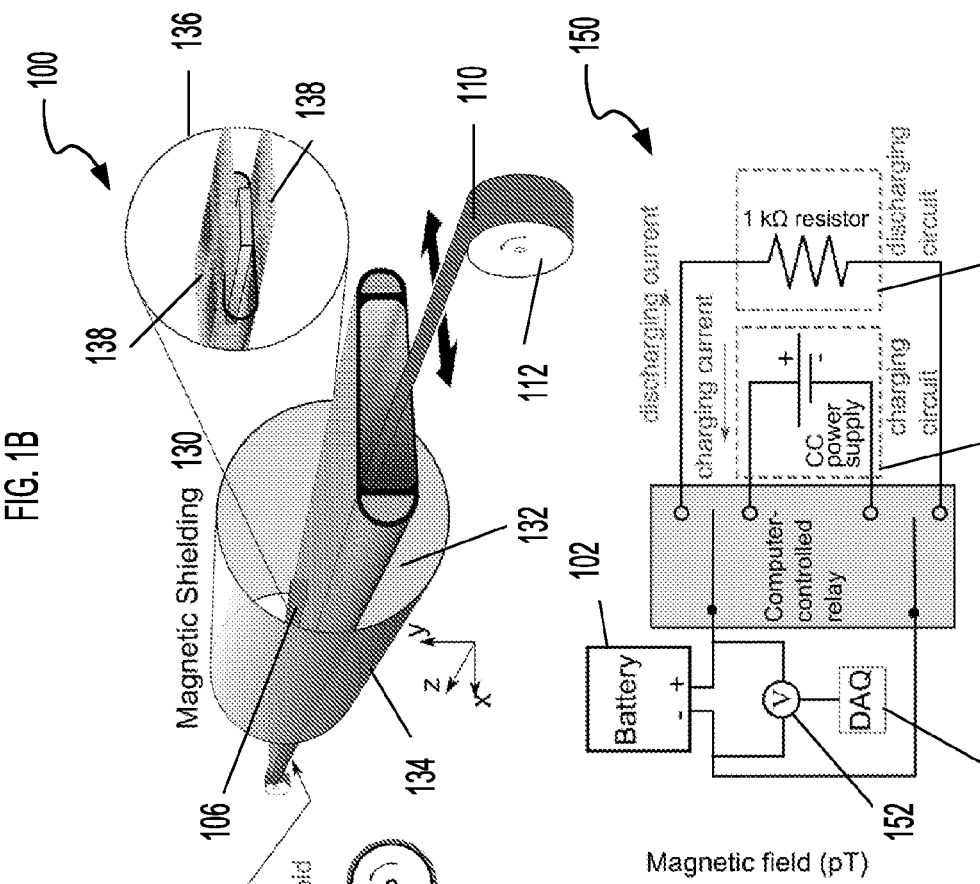
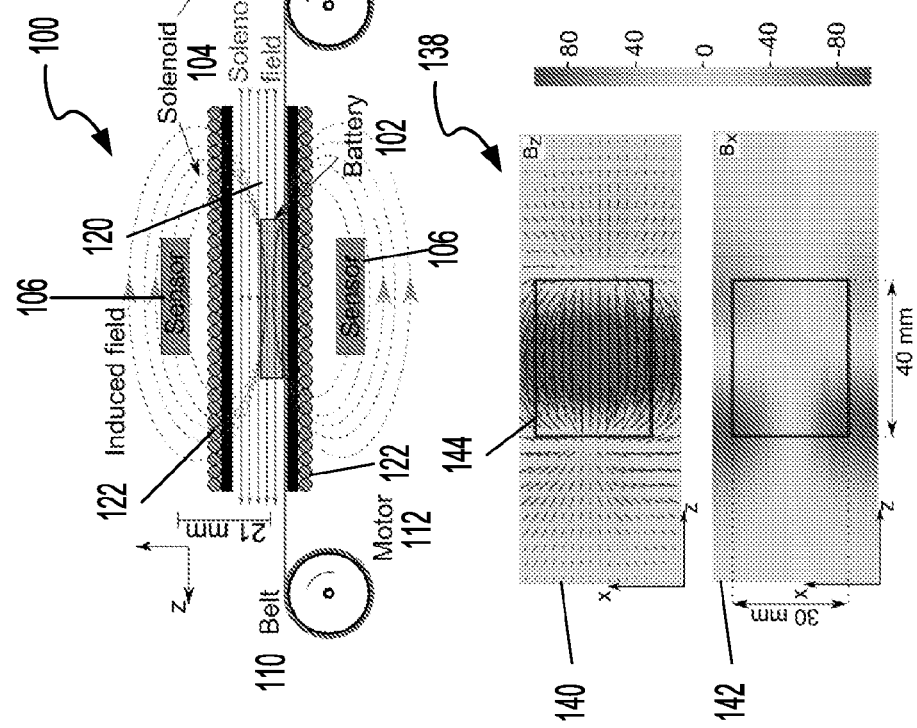
FIG. 1A
FIG. 1B
FIG. 1C
FIG. 1D

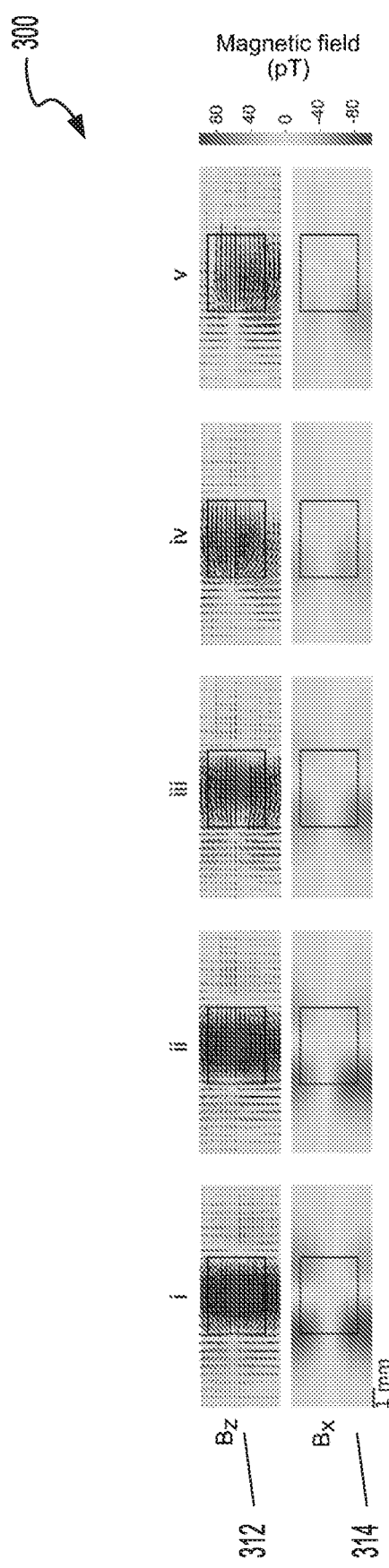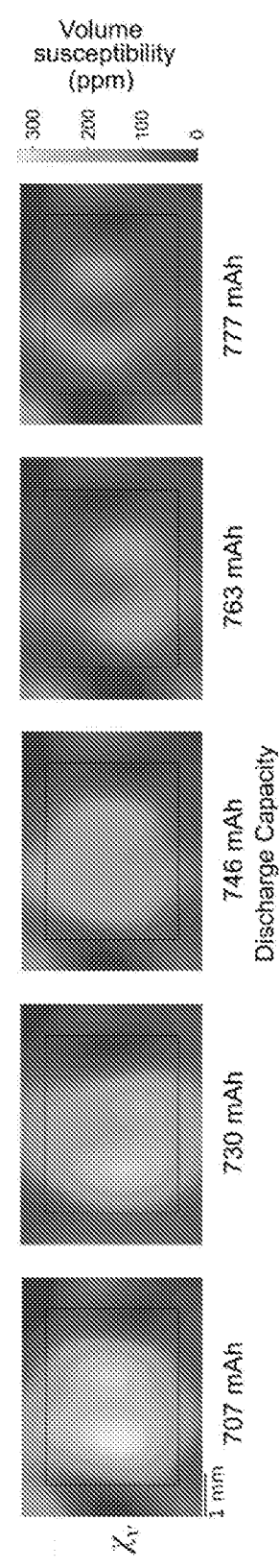
FIG. 3A
FIG. 3B

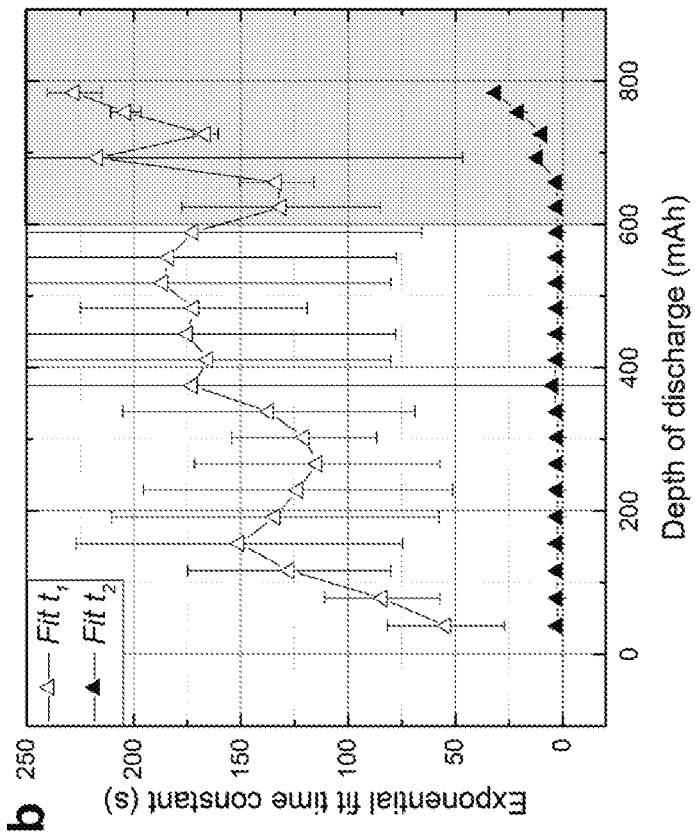
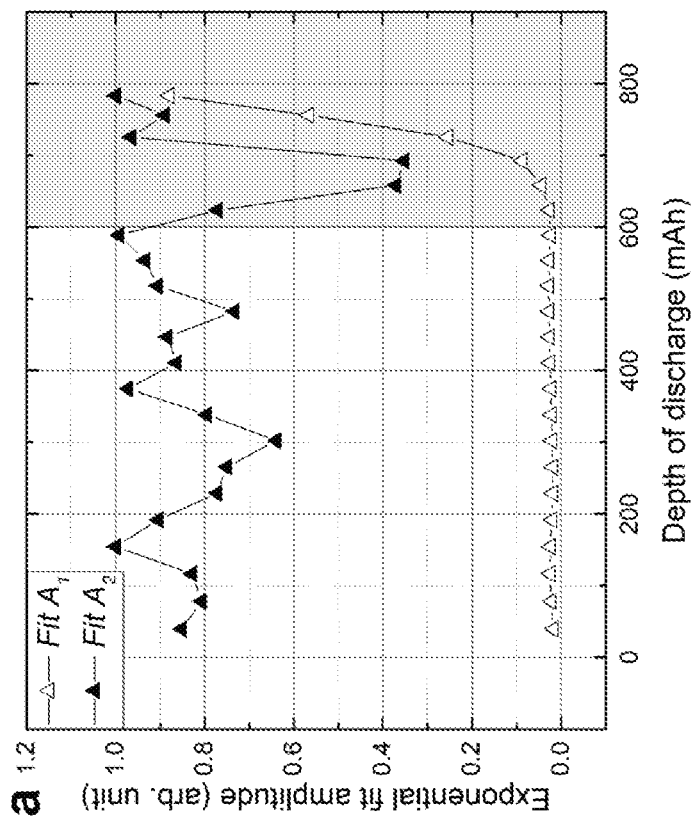
FIG. 8A
FIG. 8B

SYSTEMS AND METHODS FOR MAGNETIC SUSCEPTOMETRY OF DEVICES WITH MAGNETOMETRY

CROSS-REFERENCE TO RELATED APPLICATIONS

The present application is a U.S. national phase of PCT Application No. PCT/US2020/029524, filed Apr. 23, 2020, which claims the benefit of and priority to U.S. Provisional Patent Application No. 62/838,909 filed Apr. 25, 2019, the content of which is incorporated by reference herein in its entirety.

TECHNICAL FIELD

The present disclosure generally relates to the field of magnetic susceptibility measurements (magnetic susceptometry), and more specifically, to systems and methods to measuring magnetic fields produced by devices using magnetometer sensors.

BACKGROUND

Studying commercial battery designs under their typical operating conditions using conventional analytical tools has proven to be difficult due to the large size, complicated structure and material properties of these devices. Due to these limitations, most studies have been restricted to specialized cell designs with properties amenable to study using specific techniques. These restrictions have meant that the investigation of performance and failure mechanisms in batteries is still performed destructively by cycling multiple cells and taking them apart at critical points to analyze changes that have occurred. This process involves considerable time, effort and expense. Additionally, once cells are compromised, for example, by mechanical impact, overcharging, or end-of-life degradation, determining the causes and propagation of such failures may be a challenge. Moreover, physical and chemical changes occurring when the cell undergoes destructive analysis can compromise or alter any information obtained.

Nuclear Magnetic Resonance (NMR) and Magnetic Resonance Imaging (MM) are methods for studying battery materials. NMR and MM are able to probe a range of physical and chemical characteristics in situ, albeit in cell housings designed specifically for the experiments.

In magnetic resonance imaging, localization is performed with the help of magnetic field gradients. Electromagnetic radiation decays exponentially when it enters a conducting region with a characteristic length, called the skin depth.

$$\delta = \sqrt{\frac{1}{\pi \mu \nu \sigma}}$$ (Equation 1)

where $\nu$ is the frequency of the field, $\mu$ the permeability of the conductor and $\sigma$ its conductivity. This effect has implications for the sensitivity of magnetic resonance (MR) techniques, which rely on radio frequency (rf) fields to excite and detect processing spins from within conducting regions.

A feature Equation 1 above is the dependence on $\nu^{-1/2}$ which means that at higher frequencies (corresponding to experiments performed at higher magnetic fields) $\delta$ is reduced. For example, $\delta=12.3$ μm for nuclear spins of Lithium-7 ($^7$Li) in metallic lithium at a magnetic field of a 9.4 T (larmor frequency, $\nu_n$=155 MHz) while Lithium-6 ($^6$Li) nuclei in the same sample will have a larger effective skin depth, $\delta=20.0$ μm because of the lower gyromagnetic ratio of this isotope and therefore lower larmor frequency ($\nu_n$=59 MHz). For a corresponding electron spin transition, GHz frequencies would be relevant, and the skin depth would be in the range $\delta \approx 1$ μm.

The prospect of applying magnetic resonance techniques (e.g., NMR and MRI) to commercial batteries is restricted because almost every cell design is encased in a conductive material, for example, solid stainless steel, aluminum, aluminum-laminated films used in pouch cells, etc. The radiofrequency (rf) fields used in typical magnetic resonance experiments are incapable of penetrating the conductive material (i.e., metallic layer) in order to excite and detect the nuclear magnetization. In addition, rf penetration in battery cells is further hampered by the small distance between electrode layers.

A need exists for improved technology capable of applying magnetic resonance and magnetic susceptometry, and magnetometry techniques to diagnose batteries in an accurate and nondestructive manner.

SUMMARY

The increasing demand for high-capacity rechargeable batteries highlights the need for sensitive and accurate diagnostic technology for determining the state of a cell, for identifying and localizing defects, and for sensing capacity loss mechanisms. Atomic magnetometry can be leveraged to map the weak induced magnetic fields around Li-ion battery cells in a magnetically shielded environment. The ability to rapidly measure cells nondestructively can allow testing of commercial cells in their actual operating conditions, as a function of state of charge. These measurements can provide maps of the magnetic susceptibility of the cell, which follow trends characteristic for the battery materials under study upon discharge. In particular, hot spots of charge storage can be identified. In addition, the measurements can measure transient internal current effects, at a level of nA-μA, which are shown to be dependent upon state of charge. These effects highlight non-contact battery characterization opportunities. The diagnostic power of this technique can be used for the assessment of cells in research, quality control, or during operation, and can uncover details of charge storage and failure processes in cells.

The ability to detect changes in magnetic susceptibility distributions in rechargeable battery cells by measuring the small induced magnetic fields around battery cells with atomic magnetometers is demonstrated. These measured fields are further shown to correlate with the state of charge of the cell. In addition, magnetic fields produced by weak transient internal currents have been detected with the same approach. In the overdischarge region the marked lengthening of the current relaxation timescales was observed. These measurements can be performed in situ and operando in realistic cells of commercial-type design under standard conditions. Magnetic shielding and a solenoid were arranged in such a way that the sensors did not directly measure the magnetic field produced by the solenoid, while retaining full sensitivity to the fields originating from and induced within the battery. These measurement observables provide opportunities for cell characterization, classification, and monitoring. The approach and method are scalable and could be adapted to measure large-format cells as well, as used, for example, in electric vehicles. This diagnostic technique could be used across all stages of battery cell research, production, and deployment.

The systems and methods described in this application relate to diagnosing internal characteristics of devices by measuring induced and/or intrinsic magnetic fields of the devices. The induced magnetic field (e.g., the magnetic susceptibility) can be linked to a state of charge and distribution of charged elements within the device, thus providing diagnostic information on the properties of the device and how the properties change over time. The magnetic susceptibility distribution can be measured using the systems and methods provided herein. The presented measurement of magnetic susceptibility can be performed on materials, solutions, chemical substances, or tissue samples. Internal electric currents of devices can be measured to provide diagnostic information of the device (e.g., rechargeable batteries). The measurement of internal currents can be linked to device parameters. The electric currents can be direct currents or alternating currents.

In one implementation, a method of diagnosing internal characteristics of a device includes applying a strong magnetic field to the device. The method can include reducing the strong magnetic field at a location of one or more sensors. At least one of the one or more sensors is proximate to the device. The method can include measuring induced magnetic fields around the device. The induced magnetic fields can include diagnostic information on properties of the device and how the properties change over time. The device may be, for example, a rechargeable or primary battery, a capacitor, a supercapacitor, or a fuel cell.

The method can include correlating the induced magnetic fields around the device with a state of charge of the device. Measuring the induced magnetic fields around the device can include performing in situ measurements. Measuring the induced magnetic fields around the device can include performing operando measurements. The method can include measuring internal electric currents of the device. The method can include fitting the induced magnetic fields around the device to a magnetic field model. The magnetic field model can be based on at least one of a current or current distribution. The magnetic field model can be based on a magnetic susceptibility distribution. The method can include mapping magnetic susceptibility within the device. The one or more sensors can form an array of sensors. The method can include the one or more sensors measuring one, two, or three magnetic field components (x, y, z).

In a further implementation, a system for diagnosing internal characteristics of a device includes a magnetic shield, a solenoid positioned within the magnetic shield, and one or more sensors positioned within the magnetic shield and outside the solenoid. The device can be removably positioned within the solenoid. Induced magnetic fields can be received by the one or more sensors.

The device can be positioned on a conveyor belt or another type of positioning system. The device may be, for example, a battery, a capacitor, a supercapacitor, or a fuel cell. The one or more sensors can form an array of sensors. The one or more sensors can be configured to directly measure the induced magnetic field. The device can include a data acquisition unit configured to collect data corresponding to the induced magnetic field received by the one or more sensors. The solenoid can be configured to apply a strong magnetic field to the device. The one or more sensors can be configured to measure induced magnetic fields around the device. The device can include one or more processors configured to correlate the induced magnetic fields with a state of charge of the device.

In a further implementation, a method of diagnosing internal characteristics of a device includes applying a strong magnetic field to the device. The method can include measuring, by one or more sensors disposed proximate to the device, induced magnetic fields around the device. The method can include applying alternating currents to the device.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIGS. 1A-1D illustrate an embodiment of a system for magnetic susceptometry of a battery. FIG. 1A illustrates a cross-section through a solenoid showing a battery. FIG. 1B illustrates a perspective view of a solenoid within a magnetic shield. FIG. 1C illustrates induced magnetic field maps. FIG. 1D illustrates a diagram of a circuit for charging and discharging.

FIGS. 3A-3B illustrate magnetic field maps for various battery cell charge states and voltages, according to an embodiment.

FIGS. 8A-8B illustrate results of fitting battery voltage measurements in a relaxation period immediately following disconnection from a discharge resistor, according to an embodiment.

Figure 2A:
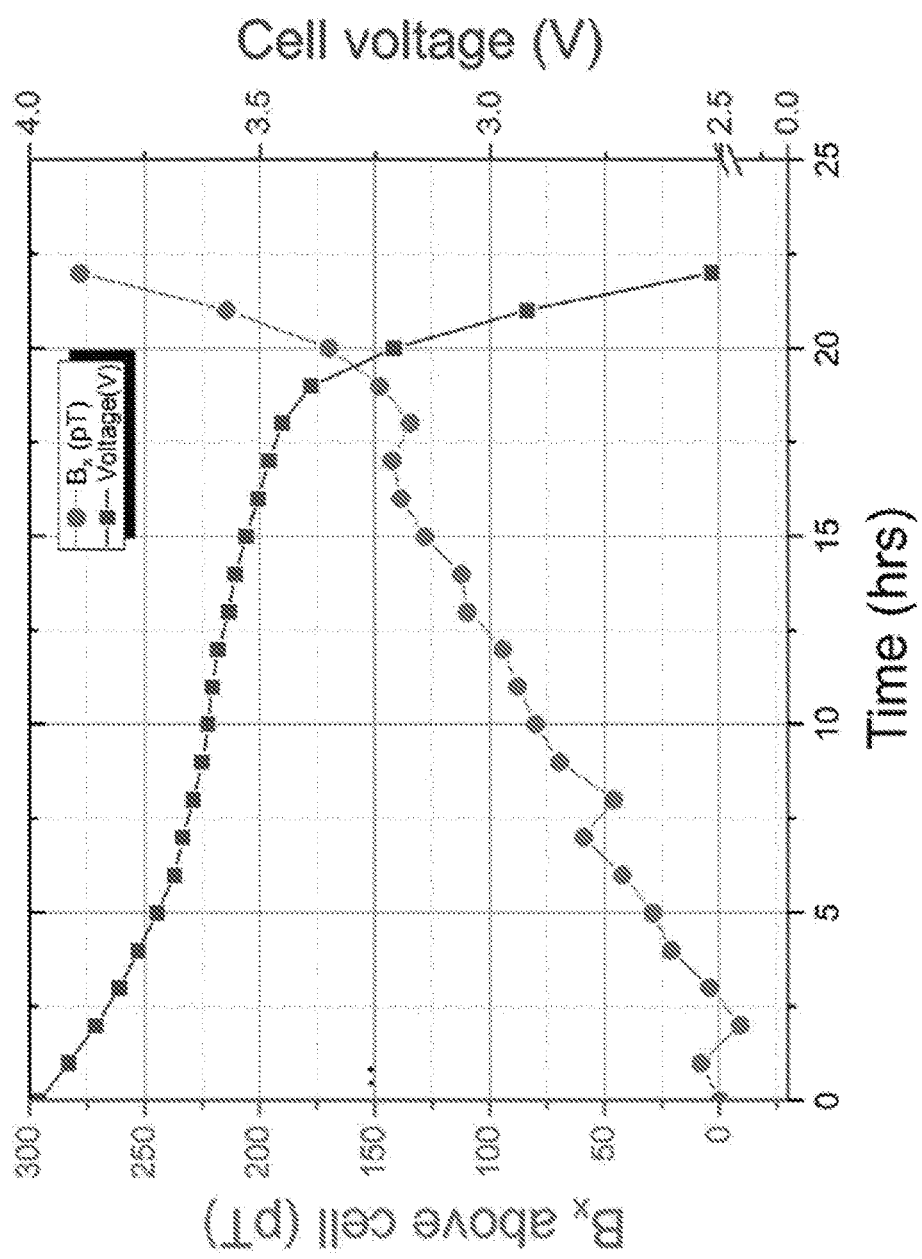
FIG. 2A illustrates long-term discharging profiles of a battery as shown in FIG. 1, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

A long-standing pain point in battery research and development is the difficulty of diagnosing cells in commercial-type cell designs in their target form factors and noninvasively determining the state of charge and defects therein. The systems and methods described herein advance battery diagnostic techniques with the establishment of a contactless method using highly sensitive atomic magnetometers to directly measure and map a battery's induced magnetic field. The technique provides detailed spatial information about possible internal defects and damage, without compromising the battery. Persistent, long-term internal currents within the battery are disclosed, which highlights diagnostic tools afforded by the sensitivity of atomic magnetometers. The systems can be compact, fast, cost-effective, and scalable, and thus of significant interest to academic battery research and industry.

Rechargeable batteries are important for technological developments. Rechargeable batteries can enable the use of renewable energy sources and power electric vehicles, cell phones, and other portable electronics. Important to the success of many rechargeable battery-powered developments is the reliable fabrication and deployment of battery cells with sufficient capacities and lifetimes. A challenge in this process, however, is to determine the quality of cells by nondestructive measurements. Currently-used techniques which can give in situ/operando information include synchrotron-based scanning transmission X-ray microscopy, X-ray micro-diffraction, and neutron diffraction and Raman spectroscopy. Manufacturers can perform electrochemical testing and limited 2D X-ray scanning. X-ray tomography can be a tool as well for commercial cells but is generally too slow for high throughput use. Ultrasound-based measurements can be a tool for characterization of cells based on changes in density and mechanical properties.

Critical device parameters often elude many such examinations. In particular, once cells are compromised by mechanical impact, overcharging, or otherwise reaching their end of life, it is particularly difficult to investigate the causes and the propagation of failure modes. Destructive analysis can provide important clues, but materials can be significantly altered in the process. Furthermore, this approach precludes a study of cells over time and does not give access to markers for cell lifetimes. As a result, there is a need for a high-throughput, non-contact, diagnostic technique that can be deployed in any stage of battery production or life-cycle.

Magnetic susceptibility changes within cells can be measured non-destructively using an inside-out MRI (ioMRI) technique that uses the $^1$H nuclear spin resonance frequencies in water to measure the susceptibility-induced field surrounding a cell when placed in a strong magnetic field. Changes in the magnetic susceptibility can be tracked across the charge-discharge cycle, and these changes can follow trends of the lithiation state of the cathode material. This approach provides a single-point state of charge measurement and allows for the identification of inhomogeneities or non-idealities of charge storage in electrochemical cells. The ioMRI measurement is fast and provides high resolution but may rely on complex and costly MRI instrumentation. Moreover, while ioMRI is capable of mapping the charge distribution inside a cell, it may be unable to distinguish between internal currents and induced effects (the magnetic field cannot easily be turned off), and may lack the sensitivity to detect tiny (e.g., on the order of nanoamperes to microamperes, etc.) persistent internal currents that occur after charging or discharging.

In the systems and methods described herein, the use of atomic magnetometers to enable mapping of the magnetic susceptibility within cells, and to report on the localized state of charge and the defects inside is demonstrated. Magnetometry can be used for fully functioning macroscopic devices and form factors operating under standard conditions. Many battery material problems arise when upscaling from small cells to intermediate pouch cell designs, and hence it is important to be able to diagnose internal characteristics of devices under realistic operating conditions, as many materials properties can change fundamentally in such situations. Therefore, the measurement technique demonstrated herein provides information which is challenging to obtain in other ways. With this technique, hotspots in charge storage can be identified within cells. Furthermore, the use of these sensors allows the measurement of transient internal currents following cell discharge. These currents are particularly pronounced in the region of overdischarge.

In general, the systems and methods described in this application relate to diagnosing internal characteristics of devices (e.g., batteries) by measuring an induced magnetization of the devices. In the embodiments described in this application, the device is a rechargeable battery. However, the present application is not limited in this regard. The device may be, for example, a primary battery, a capacitor, a supercapacitor, a fuel cell, or another electrochemical device. In the most general case, the device can include a material sample, a chemical substance, a solution, a mixture, a tissue sample, among others. A method of diagnosing internal characteristics of a device includes applying a strong magnetic field to the device. The method can include reducing the strong magnetic field at a location of one or more sensors. At least one of the one or more sensors is proximate to the device. The method can include measuring the induced magnetization of the device. The magnetization of the device can include diagnostic information on properties of the device and how the properties change over time. Batteries are analyzed based on a link between the induced magnetic field and a state of charge or distribution of charged elements within the battery. Additionally, batteries are analyzed based on a measure of internal electric currents, which may change over the course of a charging or discharging cycle and as a result of battery degradation and failure. The measurement of internal electric currents can be linked to device parameters. The measurement of the internal electric current parameters does not require applying a strong magnetic field.

Referring to FIGS. 1A-1D, a system for magnetic susceptometry of a battery 102 is shown. To measure a battery's magnetic properties across a discharge cycle, the behavior of the cell voltage and the induced magnetic field can be monitored during 30-minute rest periods between 30-minute discharge periods. For discharge, the battery electrodes can be connected to a 1 kΩ resistor, as shown in FIG. 1D. The solenoid field was on during this measurement, so the apparatus was sensitive to susceptibility-induced fields. FIG. 1A illustrates a side view of a system 100 for magnetic susceptometry. A battery 102 can be placed on a motor-driven conveyor belt 110 that moves the cell through a solenoid 104, which provides a constant internal magnetic field. Magnetic-field sensors 106 can be placed in the ultralow-field region, above and below the solenoid 104. The system 100 for magnetic susceptometry of a battery 102 can include a conveyor belt 110 to receive the battery 102, a motor 112 to power the conveyor belt 110, a solenoid 104, and one or more sensors 106. In use of the system 100, the conveyor belt 110 can be partially disposed within the solenoid 104. The battery 102 can be disposed within the solenoid 104 and supported by the conveyor belt 110. The battery 102 can be a cell, pouch cell, Li-ion cell, or Li-ion battery, among others.

The solenoid 104 can include a coil of wire. A constant current can run through the solenoid 104. The solenoid 104 can include a solenoid interior 120. The solenoid interior 120 can include a region containing a strong magnetic field. The strong magnetic field for a cylindrical solenoid 104 can be approximated by $$B = \mu_0 nI \quad \text{(Equation 2)}$$

where B is the strength of the magnetic field, $\mu_0$ the permeability of free space, n is the number of coils of the wire per unit length and I is the current through the wire. The solenoid 104 can include a solenoid exterior 122. The solenoid exterior 122 can include a region containing a weak magnetic field. The weak magnetic field is less than the strong magnetic field of the solenoid interior 120. For a solenoid of infinite length, the magnetic field of the solenoid exterior 122 is zero. The cross-section of a cylindrical solenoid perpendicular to a long-axis of the solenoid 104 can include a circle. The battery 102 can be positioned in the solenoid interior 120 or the region containing the strong magnetic field. The conveyor belt 110 can run through the solenoid interior 120. The battery 102 can be positioned on the conveyor belt 110. In some embodiments, the electric current parameters can be measured without the solenoid 104. The electric current parameters can be measured without application of a strong magnetic field. Magnetic susceptibility can be measured using the solenoid 104. In some embodiments, the solenoid 104 achieves a region with a high magnetic field proximate to a region with a low magnetic field. The system 100 may also use a device that is not a solenoid 104 to achieve a region with a high magnetic field proximate to a region with a low magnetic field.

The one or more sensors 106 can include magnetic-field sensors. The magnetic-field sensors can detect magnetic fields. Magnetic susceptibility of the battery 102 can be determined based on the magnetic fields. Internal electrical currents of the battery 102 can be determined based on the magnetic fields. The magnetic fields due to internal electrical currents and permanent magnetism of the battery 102 can be separated from the magnetic fields due to induced magnetism. Separating the respective magnetic fields can be performed by subtracting a measurement with the magnetic field turned off. The one or more sensors 106 can include atomic magnetometers. The atomic magnetometers can detect the modification of energy levels of atoms by an external magnetic field. The one or more sensors 106 can include magnetometers based on nitrogen-vacancy (NV) centers in diamond. The one or more sensors 106 can include Hall probes or Hall effect sensors. The one or more sensors 106 can include magnetoresistive sensors. The one or more sensors 106 can include fluxgate sensors. The one or more sensors 106 can include superconducting quantum interference devices (SQUIDs). The magnetoresistive sensors can detect an applied magnetic field. The magnetoresistive sensors or NV magnetometers can have a high sensitivity over a large dynamic range. The one or more sensors 106 with a high sensitivity over a large dynamic range can be used to detect large changes in susceptibility as the battery 102 is charged or discharged. The one or more sensors 106 can include relative magnetic field sensors. The one or more sensors 106 can image internal shorts during charging or discharging of the battery 102. The one or more sensors 106 can allow for a high resolution of the induced magnetic field. The one or more sensors 106 can be positioned in a sensor array. The sensor array can be used to reduce mapping time of the magnetic field maps. The one or more sensors 106 can include fluxgate sensors or fluxgate magnetometers. The one or more sensors 106 can be positioned in the solenoid exterior 122 or the region containing the weak magnetic field. The one or more sensors 106 can be positioned in a region where the magnetic field is minimized. The one or more sensors 106 can be proximate to the battery 102 (e.g., close enough to the battery 102 to detect or measure induced magnetization of the battery 102, close enough to the battery 102 to detect or measure magnetic field from which magnetic susceptibility and internal electrical currents of the battery 102 are derived). The one or more sensors 106 can form an array of sensors. The one or more sensors 106 can measure one, two, or three magnetic field components. The one or more sensors 106 can measure a magnetic field component in an x-direction, y-direction, or z-direction. The one or more sensors 106 can be operated in a gradiometer mode. In the gradiometer mode, from the measured magnetic field by a first sensor of the one or more sensors, the measured field from a second sensor of the one or more sensors can be subtracted to increase accuracy and robustness. For more sensors, a common mode is subtracted to increase accuracy and robustness.

FIG. 1B illustrates a 3D drawing of the system 100. The solenoid 104 is shown extending beyond the Twinleaf MS-2 magnetic shielding (only the innermost shield is shown). A total of four concentric cylinders can be used. The conveyor belt 110 can move the battery 102 back and forth along the z-axis, while translation stages on each end move the entire belt 110 with 0.1 mm (millimeter) precision along the x-axis. The inset illustrates the location of the resulting two-dimensional field maps acquired by this setup. In the example of FIG. 1B, the solenoid 104 can be positioned within a magnetic shield 130. The magnetic shield 130 can include a magnetic shield interior 132 and a magnetic shield exterior 134. The one or more sensors 106 can be positioned in the magnetic shield interior 132. The magnetic shield 130 can ensure that the magnetic flux lines emerging form the ends of the solenoid 104 connect in the magnetic shield exterior 134. The magnetic shield 130 can include a Twinleaf MS-2 magnetic shielding. The magnetic shield 130 can be composed of mu-metal. The magnetic shield 130 can be composed of a nickel-iron soft ferromagnetic alloy with high permeability. The magnetic shield 130 can be composed of a material that can support the formation of a magnetic field within the material. The magnetic shield 130 can have open ends to allow the solenoid to extend through the magnetic shield interior 132. The magnetic shield 130 can reduce background noise of the magnetic field measurements. The induced field amplitude can be proportional to the field produced by the solenoid 104. The field of the solenoid 104 can be increased to increase the signal size.

The shape and size of the solenoid 104 may be modified or customized to receive different shapes and sizes of batteries 102. The shape of a cross-section of the solenoid 104 perpendicular to a long axis (e.g. x-axis) of the solenoid 104 can be an obround shape. The solenoid 104 can have open ends to allow the conveyor belt 110 to extend through the solenoid interior 120. The open ends of the solenoid 104 can extend beyond the open ends of the magnetic shield 130. The solenoid 104 can extend beyond the open ends of the magnetic shield 130 to allow magnetic flux lines generated by the solenoid 104 to connect outside of the shield region (e.g., at the magnetic shield exterior 134). The sensors can be operated in less than 50 nT background field.

The battery 102 can undergo translational motion. The conveyor belt 110 can move the battery 102. The motor 112 can power the conveyor belt 110. The conveyor belt 110 can move the battery 102 along the z-axis. The conveyor belt 110 can move the battery 102 back and forth along the z-axis. The system 100 can include a translation stage. The translation stage can move the conveyor belt 110 along the x-axis. For example, the translation stage can move the conveyor belt 110 with 0.1 mm precision along the x-axis. By moving the translation stage, the battery 102 can move along the x-axis. The translational motions of the battery 102 during sensing can produce two-dimensional field maps 138 of the battery 102. The inset 136 illustrates the location of the resulting two-dimensional field maps 138 of the battery 102 acquired by the system 100.

FIG. 1C illustrates sample-induced magnetic field map for a "healthy" battery (e.g., charged to 90% capacity) obtained from a single sensor 21 mm above the battery. The upper plot shows a map of the z-component of the measured field, with an overlaid vector map of the total field in the x-z sensor plane. The lower plot shows the x-component map of the measured field. The battery outline 144 is shown as a rectangle. In the example of FIG. 1C, the two-dimensional field maps 138 of the battery 102 are shown. The battery 102 of FIG. 1C was a healthy battery charged to 90% capacity. The first plot 140 shows a map of the z-component of the measured field. The first plot 140 shows a vector map of the total field in the x-z plane at a sensor. The second plot 142 shows the x-component map of the measured field. The battery outline 144 is shown in the first plot 140 and the second plot 142. The leads of the battery 102 are on the left part of the battery outline 144. The two-dimensional field maps 138 can represent the measured magnetic field. The measured magnetic field can originate from electrical currents. The measured magnetic field can originate from intrinsic magnetization of the battery 102. The measured magnetic field can originate from induced magnetization of the battery 102.

FIG. 1D illustrates a circuit diagram for charging and discharging. The computer-controlled relay disconnects the battery cell from the charging/discharging circuits during measurements. However, the data acquisition (DAQ) unit 154 remained connected throughout the measurement. In the example of FIG. 1D, a diagram of a circuit 150 for charging and discharging is shown. The charging circuits 164 and discharging circuits 162 are independently wired. Induced magnetic field measurements of the battery 102 were taken in 30 second cycles while a computer-controlled relay disconnected the circuit. A voltmeter (V) 152 is connected to a computer for data acquisition (e.g., data acquisition unit 154). CC stands for constant current. The battery 102 is connected to the circuit 150.

Magnetic susceptibility measurements can involve placing a sample in a magnetic field and measuring the smaller induced magnetic fields. At the same time, the magnetic field sensors, which typically have a limited dynamic range, can be located in a small magnetic field (<50 nT) in order to detect the minute fields (e.g., <100 pT) induced by the cell. A long flat solenoid can be used to apply a magnetic field to the cell. The solenoid pierced a magnetically shielded region produced by concentric cylinders of mu-metal. In some embodiments, four concentric cylinders can be used. In this arrangement, a negligible magnetic field is produced outside of the solenoid. The magnetic field sensors are placed in this region of negligible field within the magnetic shield and operate within their dynamic range (FIG. 1A). The induced magnetic field of a battery cell located inside the solenoid is communicated to the sensor region without impediment. In addition to reducing environmental magnetic fields, the magnetic shield arrangement (FIG. 1B) also allows the magnetic flux lines emerging from the ends of the solenoid connect outside of the shielded region.

Atomic magnetometers can be used as sensors 106 because they offer sensitivity and simultaneous multi-axis measurements. These sensors 106 can provide a measure of the magnetic field via optical detection of the atomic electron resonance frequency shifts. Atomic magnetometers can be commercially available in miniaturized designs. To obtain a magnetic field map of the battery 102, the cell is moved via the conveyor belt 110 within the solenoid 104 (FIG. 1B). The conveyor belt 110 moves the battery 102 past the sensors 106 for scanning along the z-coordinate. For subsequent scans, the cell was translated along the x-axis for the next scan while it was transported back to the original z position. In this way, the induced field from the battery was scanned across a rectangular area above and below the cell. FIG. 1C shows representative field maps for the magnetic field components, $B_x$ and $B_z$, obtained from a single sensor 106 above the battery 102. These maps, recorded with the solenoid on, are consistent with maps expected for a rectangular block with approximately uniform susceptibility (similar to a dipole field map), which represents a good first approximation of a cell. FIG. 1D shows the circuit setup for switching between the charge and discharge operation of the cell. The cell was connected to this circuit via twisted wires running along the conveyor belt.

Without the solenoid field applied to the battery, the setup can be sensitive to internal currents within the battery, and any remnant magnetization of the battery components. Turning on the solenoid field induces a magnetization within the cell, dependent on the local magnetic susceptibility. This magnetization produces a field that can be detected by the magnetometers.

The long-term discharging measurements 200 are shown in FIG. 2A. The long-term discharging measures can include long-term discharging profiles. The magnetic field in the x-direction can be measured at a distance (e.g., 2 cm) above the center of the battery 102. The one or more sensors 106 can be zeroed at the beginning of the measurement. The magnetic field value can be measured while the battery 102 is disconnected from the discharging circuit 162. The long-term discharging profiles can include the measured magnetic field vs. time. The voltage value can be measured while the battery 102 is disconnected from the discharging circuit 162. The long-term discharging profiles can include the measured cell voltage vs. time. The highest (4 V) voltage limit represent a recommended maximum voltage for the battery 102. The lowest (2.5 V) voltage limit represent a recommended minimum voltage for the battery 102.

Figure 4:
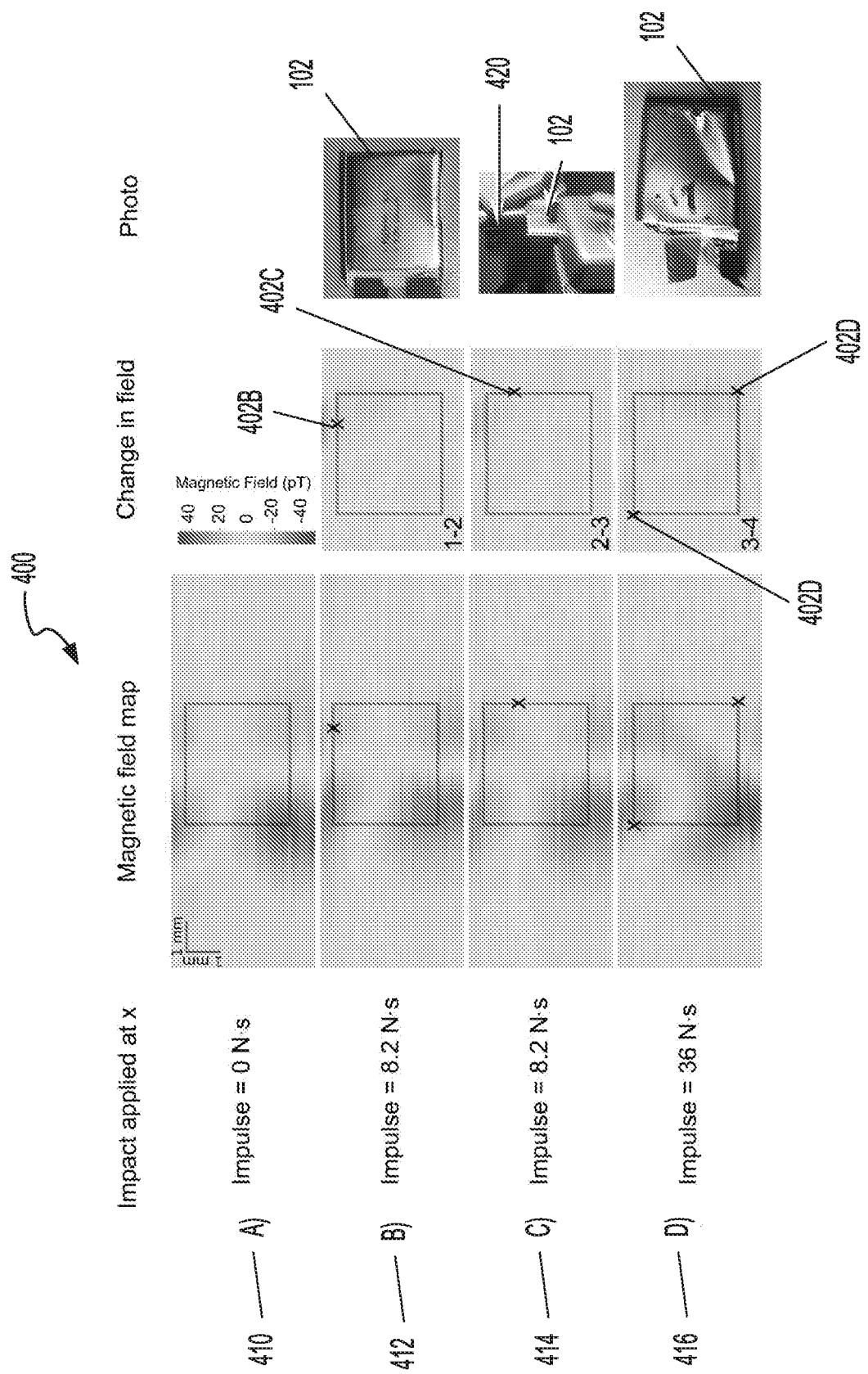
FIG. 4 illustrates magnetic field maps for various physical damage scenarios of a battery, according to an embodiment.

The cell is transported through the solenoid interior 120 and past the first sensor and the second sensor with the use of a conveyor belt 110 made of electrical-tape. The electrical-tape can have a non-magnetic, low-friction backing. The conveyor belt 110 can be moved via servo motors that are positioned in the magnetic shield exterior 134 or outside the shielded region. The first sensor and the second sensor measure x and z magnetic-field components in a plane parallel to the battery 102. The resulting field maps in FIG. 4 provide spatially detailed maps of the induced magnetic field arising from magnetization within the battery 102. Each map can take approximately 15 min to produce. Each map can be limited by the speed of the motors. Each map can be the average of six runs, taken at a specific charge state in the battery 102, indicated by the voltage.

Long-term continuous discharging of the battery followed by a disconnection of the terminals can lead to a "recovery effect", where the battery voltage relaxes to a higher equilibrium voltage level over a period of time. The magnetic sensors can record transient fields that are associated with this voltage increase based upon the well-matched long-term time constants of the exponential relaxation to a steady state value.

Figure 2B:
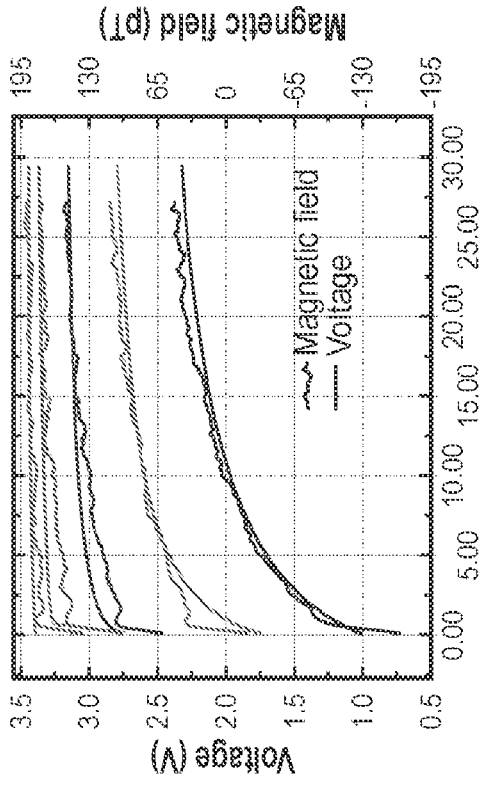
FIGS. 2B-2E illustrate magnetic field and voltage response of a cell after discharging, according to an embodiment.
Figure 2C:
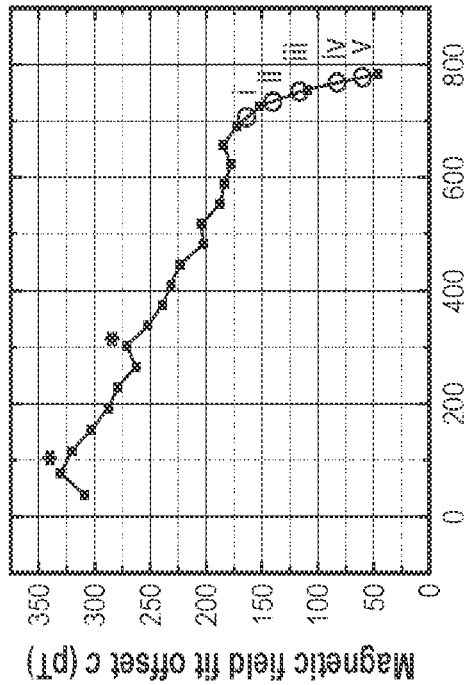
Figure 2D:
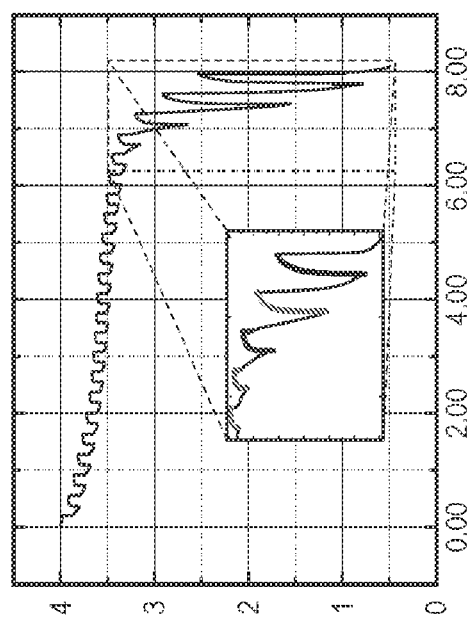
Figure 2E:
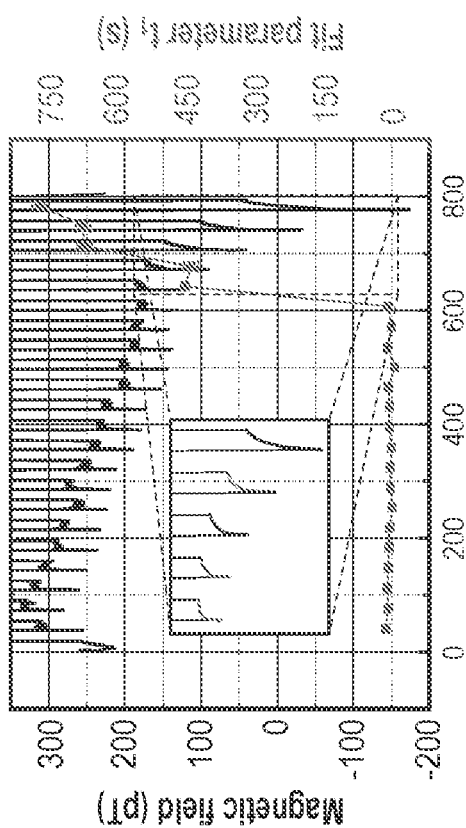

Magnetic field measurements above the cell at a location corresponding to the upper left corner of the battery outline in FIG. 1C, and voltage measurements as a function of discharge capacity. The shaded areas indicate the overdischarge region, when the battery was measured after being discharged beyond its rated capacity (600 mAh). FIG. 2B illustrates the magnetic field, $B_x$, measured with an atomic magnetometer for periods of 30 min at the indicated discharge capacity, beginning immediately after disconnecting the discharge circuit. The inset shows detail of the magnetic field decay for discharge capacities beyond the battery rating, where the equilibration time to a steady-state value increases, suggesting the presence of persistent internal currents within the cell. Squares indicate the fitted time constants of the exponential behavior within each measurement period. Magnetic field values are referenced to a value extrapolated to the full discharge capacity of cell (OCV=0 V, 813 mAh). FIG. 2C illustrates steady-state magnetic field values determined by fitting the 30 min measurement curves in FIG. 2B to an exponential decay. The field amplitude exhibits a gradual decrease until reaching the rated capacity and a steeper falloff in the shaded region. Roman numerals indicate the points at which the magnetic field maps of FIG. 3A were acquired. Asterisks mark data points which were acquired during large environmental field fluctuations as assessed by an independent fluxgate measurement. FIG. 2D illustrates voltage vs. discharge capacity. During the discharge periods, the measured voltage drops and then recovers when the battery is disconnected from the discharge circuit. The inset shows detail of the voltage signal decay for discharge capacities beyond the battery rating. FIG. 2E illustrates details of the signal decay for discharge capacities beyond the battery rating (600 mAh).

FIG. 2B shows a series of 30-minute magnetic field measurements during the rest periods immediately after disconnecting the cell from the discharge circuit. The magnetic field values are referenced to the open cell voltage, OCV=0 V (813 mAh depth of discharge), extrapolated from the behavior in the overdischarge regime. Transient magnetic fields can be observed, which relaxed exponentially towards a steady-state value. The signal immediately following each period of discharge was fit to a single exponential function of the form, $y(x) = Ae^{-x/t_1} + c$, where A is the amplitude of the fit function, $t_1$ is the time constant, and c is an offset representative of the long-term static value. The time constants were stable with an average of 11±4 s in the 'healthy' battery regime up to its rated capacity (600 mAh). By contrast, the time constant increased significantly to 400-750 s when discharging beyond this region. The region of overdischarge is represented by shaded regions in FIGS. 2B-2E. Squares in FIG. 2B indicate the fitted time constants of the transient fields. The long-term static value of the magnetic field, c, decreased to background levels when the solenoid field was turned off. Therefore, this value can reflect the fields generated by the induced magnetic field, and specifically relate to the magnetic susceptibility of the battery components. The transient fields can be present even when the solenoid is turned off, which provides corroboration that they are not due to susceptibility changes in the cell. Instead, the transient fields appear to be related to internal equilibration currents, which are likely related to the concentration gradient-driven diffusion of active materials in the battery. In the overdischarge region, these currents may be exacerbated as a result of accelerated self-discharge due to corrosion of the copper current collector in the electrolyte.

FIG. 2C shows that the long-term static values of the magnetic field after each discharge period exhibit a linear dependence on the depth of discharge. This relationship (e.g., correlation) between the battery's state of charge and the measured induced magnetic field, and by extension, the magnetic susceptibility, can provide a non-contact alternative to voltage measurements for battery diagnostics. Diagnosing internal characteristics of the device (e.g., a battery) can include correlating the induced magnetic fields around the device with a state of charge of the device. The features at 90 mAh and 300 mAh can be attributed to laboratory noise that occurred during the measurement, as assessed by independent fluxgate field measurements outside the shield in the vicinity of the setup (marked with an asterisk). Within the 'healthy' range (e.g., up to the rated capacity), the long-term field value changes gradually; beyond the rated discharge capacity (in the shaded region), a significantly stronger effect is observed. This behavior is in line with previous observations for these types of cells with cathode material containing a large amount of cobalt, and can be related to the change of the magnetic susceptibility over the course of discharge. Details of the composition of the cell are provided in FIGS. 6 and 7 and Table 1.

TABLE 1

EDS analysis at two different sites of the Powerstream PGEBNMU53040 Cathode. The data were analyzed using Aztec Energy software.

| Element | Site 1: wt % ± std dev | Site 2: wt % ± std dev |
|---|---|---|
| C | 13.95 ± 0.35 | 13.94 ± 0.37 |
| O | 33.19 ± 0.26 | 33.20 ± 0.28 |
| Al | 0.23 ± 0.04 | — |
| P | 0.26 ± 0.06 | 0.22 ± 0.06 |
| Ti | 0.12 ± 0.03 | 0.09 ± 0.03 |
| Mn | 3.22 ± 0.05 | 2.99 ± 0.05 |
| Co | 43.74 ± 0.025 | 44.76 ± 0.27 |
| Ni | 5.28 ± 0.09 | 4.79 ± 0.10 |
| Total | 100.00 | 100.00 |

Ultrasound diagnostic measurements also provide a non-contact and non-destructive means of determining the state of charge of a battery cell. These acoustic techniques are particularly sensitive to the density distribution of graphite, which is correlated to its lithiation state. But ultrasound diagnostic measurements show generally little sensitivity to changes in the distribution of light battery components, as well as changes in the cathode, and do not have a way of reporting on internal cell currents.

FIG. 2D shows the voltage measurement during the same experiment for comparison. Voltage was measured both during the discharge and during the magnetic field measurement period, when the battery was not connected to the discharge resistor. There is a long-term recovery period in the shaded region, which becomes stronger with depth of discharge. The time constants for this voltage measurement and those of the magnetic field measurements agreed with each other (FIG. 2E) in the overdischarge region (shaded). This finding indicates that the measured internal currents are likely related to these relaxation effects. Fitting voltage measurements during the relaxation period in both the healthy and overdischarge regimes may need a double exponential, while the magnetic field measurements fit reliably well with a single time constant. This finding can likely be attributed to the influence of the connected circuitry on the voltage measurements. The relative amplitude of the two fit components in the double exponential can be compared to establish whether transient currents or the influence from the connected circuitry is dominant. Before reaching the rated discharge capacity, the overall time scale for the voltage to settle was more than an order of magnitude smaller than in the region of overdischarge. Details on fitting the voltage time constants are shown in FIGS. 8A and 8B. FIGS. 8A and 8B also illustrate large uncertainties for the fast time constant obtained from the voltage measurements.

Battery capacity recovery effects have been explained through a variety of models, motivated by experimental data acquired via voltage measurements. The magnetic field measurement, by contrast, provides a contactless measure of the internal current effects and therefore enables a measurement that is decoupled from the electrical circuit, in addition to providing spatial resolution. As a result, future battery diagnostics using these magnetic field measurements could shed light onto the validity of these models, especially since they would also provide a spatially localized map of current behavior. Given the achieved measurement sensitivity (~10 pT/$\sqrt{Hz}$), transient internal currents as small as ~4 µA can be sensed with this setup. These measurements do not require the solenoid and can in principle be performed in a fully closed shield, in which the magnetometers can achieve a sensitivity of 20 fT/$\sqrt{Hz}$. In such an arrangement the current sensitivity could approach 8 nA.

FIGS. 3A and 3B illustrate magnetic field and corresponding susceptibility maps above a cell. Roman numerals relate these selected snapshots to the points along the discharge curve in FIG. 2C. The corresponding discharge capacity is given at the bottom. The upper panels of FIG. 3A show the field map in the z-direction, with an x-z field vector map overlaid. The lower panels FIG. 3A show the field in the x-direction. The rectangular outline represents the battery position. Battery leads (not indicated) are to the left of the rectangle. FIG. 3B show 2D magnetic susceptibility maps (indicated in ppm) obtained from a regularized inversion of the measured magnetic field.

FIG. 3A illustrates the magnetic field maps 300 for various battery cell charge states and voltages. The magnetic field maps 300 for battery cell voltages of 2540 mV, 2810 mV, 3000 mV, 3100 mV, and 3340 mV are shown. The magnetic field maps 300 can be obtained from the first sensor and the second sensor at various charge states of the battery 102. The magnetic field maps 300 follow a trend for susceptibility changes of LCO material. The magnetic field maps 300 provide a repeatable and non-invasive diagnostic of the charge state of the battery 102. The magnetic field maps 300 also reveal asymmetry in the susceptibility within the battery 102. The asymmetry of the field strength in the z-direction can be due to stronger susceptibility in one side of the battery 102. The asymmetry of the field strength in the z-direction can be due to stronger susceptibility in the side of the battery 102 with leads. The magnetic field maps 300 show little change in the magnetization pattern as a function of charge state within the normal operating range of the battery 102. The z-panels 312 show the magnetic field component in the z-direction. The battery outline 144 is shown in the z-panels 312. A vector map representing the magnitude and direction of the in-plane magnetic field at each point is also depicted. The x-panels 314 show the magnetic field component in the x-direction. The battery outline 144 is shown in the x-panels 314.

The measured magnetic field data can be analyzed directly and interpreted. The measured magnetic field data can be fitted to a magnetic field model based on a current or known currents. The measured magnetic field data can be fitted to a magnetic field model based on a magnetic susceptibility distribution. The measured magnetic field data can be inverted to obtain the distribution of magnetic susceptibility. Obtaining the distribution of magnetic susceptibility can be performed with a regularized inversion procedure based on singular value decomposition. Obtaining the distribution of magnetic susceptibility can be performed with a regularized inversion procedure based on regularization (e.g., Tikhonov regularization). Obtaining the distribution of electrical current can be performed with a regularized inversion procedure based on regularization (e.g., Tikhonov regularization). Additional magnetometry measurements can be used to subtract an alternating background field. The magnetic field inversion can be used obtain the magnetic susceptibility. The electrical current distribution could also be performed using a magnetic field inversion based on a trained neural network. Additional magnetometry measurements can be used to subtract a constant background field. A magnetometry measurement (e.g., a reference magnetometry measurement) can be made while the battery 102 is not inside the solenoid 104 or proximate to the one or more sensors 106.

The relationship between the battery's state of charge and the magnetic susceptibility can be established using ioMRI. During battery charging and discharging, the amount of lithium distributed between anode and cathode can alter the electronic configuration of the battery materials, leading to changes in magnetic susceptibility. This relationship can be studied in controlled experiments on isolated electrode materials. In a complete cell, susceptibility changes are a cumulative effect from different battery components arising from different phenomena and of different magnitude, and the ioMRI approach has shown that such changes could be observed across the charge cycle in fully operating cells.

The magnetometry approach taken herein provides a number of new opportunities for the detection and characterization of magnetic susceptibility distributions within cells, including the ability to measure at lower magnetic fields, to separate the susceptibility effects from current effects, and to measure several field components at once. FIG. 3A shows a series of 2D maps of magnetic field measurements after cell equilibration at the discharge values indicated in FIG. 2C. It is observed that the overall magnetic field decreases with discharge. Furthermore, a regularized magnetic field inversion produces magnetic susceptibility maps for each.

It is observed that the magnetic susceptibility, and hence the charge, is distributed non-uniformly across the cell, which could be due to the position of the battery tabs and other internal geometrical and material arrangements. Even though the overall susceptibility decreases, the main feature of two maxima in the distribution appears to persist through the continued discharge. The positive values for susceptibility indicate overall a paramagnetic behavior of the battery cell.

The sensitivity of the magnetic field measurements would also in principle allow the identification of defects in cells by identifying deviations from the norm in the distribution of the magnetic susceptibility, or by simply using the field measurements for cell classification. Changes in observed magnetic field maps due to physical impact can be shown.

Similar measurements can be performed with other magnetometer sensor technologies. In particular, suitable candidate sensors for efficient measurement include various types of atomic magnetometers, magnetometers based on nitrogen-vacancy (NV) centers in diamond, Hall probes, magnetoresistive sensors, SQUIDs, and fluxgates. NV magnetometers and magnetoresistive sensors, for example, could offer a relatively high sensitivity over a large dynamic range, useful for batteries containing magnetic materials or those which exhibit large changes in susceptibility as they are charged or discharged. Furthermore, the small size of these sensors could allow for a higher spatial resolution measurement of the induced magnetic field. These can be used in a sensor array to reduce the mapping time, depending on the minimal stand-off distance of the sensor. Since microwaves that are typically used in NV measurements may be undesirable in some applications, recently-developed microwave-free NV sensing protocols could be deployed in this case. In addition, a microwave-free sensing protocol and a diamond magnetometer have been used to create conductivity maps of conductive objects with sub-mm spatial resolution in a substantial background field up to 100 mT. This procedure could be adapted to AC-magnetic susceptibility measurements as well. Fluxgate sensors also offer ease of use and low cost but have lower sensitivity and poor spatial resolution. For sensors with a dynamic range that can accommodate environmental noise, it would be possible to lower the magnetic shielding demands by, for example, compensating this noise using an array of background sensors.

The induced field amplitude is proportional to the field produced by the solenoid, therefore the measurement of the magnetic susceptibility distribution could be made more sensitive by increasing the solenoid field. In addition, varying or modulating the magnetic field of the solenoid would also provide further means of separating the effects of magnetic susceptibility and internal currents. A three-axes arrangement could be implemented with sensor arrays.

FIG. 4 illustrates magnetic field maps 400 for various physical damage scenarios of a battery 102. The effect of physical damage on the induced magnetic field in a battery 102 within 5% of full charge is shown. The system 100 can diagnose defects in batter cells or batteries 102. Physical damage to the battery 102 resulting from impact can be revealed in the magnetization pattern. A weight 420 (e.g., steel rod, impact mass, mass, etc.) was dropped onto various points 402B-402C of the battery 102 from a controlled height to explore the effect that physical impact had on the magnetization pattern. Test A 410 was a control test with the battery 102 experiencing no physical damage or impact. Text A shows the undamaged field map. In tests B-D, the battery 102 was clamped from the flat sides while a mass 420 was dropped from above. Test B 412 was a test with the battery 102 experiencing an impulse of 8.2 N·s at a point 402B. Test C 414 was a test with the battery 102 experiencing an impulse of 8.2 N·s at a point 402C. Test D 416 was a test with the battery 102 experiencing an impulse of 36 N·s at a points 402D. In Test D, the battery 102 was supported from the bottom and sides, resulting in two impact points as indicated by the two 'X's. In tests B 412, test C 414, and test D 416, physical deformation to the batteries 102 was visible. However, the batteries 102 was not punctured. The batteries 102 maintained the ability to be charged, retain energy, and power LEDs, despite the batteries' apparent damage. Nevertheless, the magnetic susceptibility of the cell was altered, as evidenced by the magnetic field maps.

Figure 5:
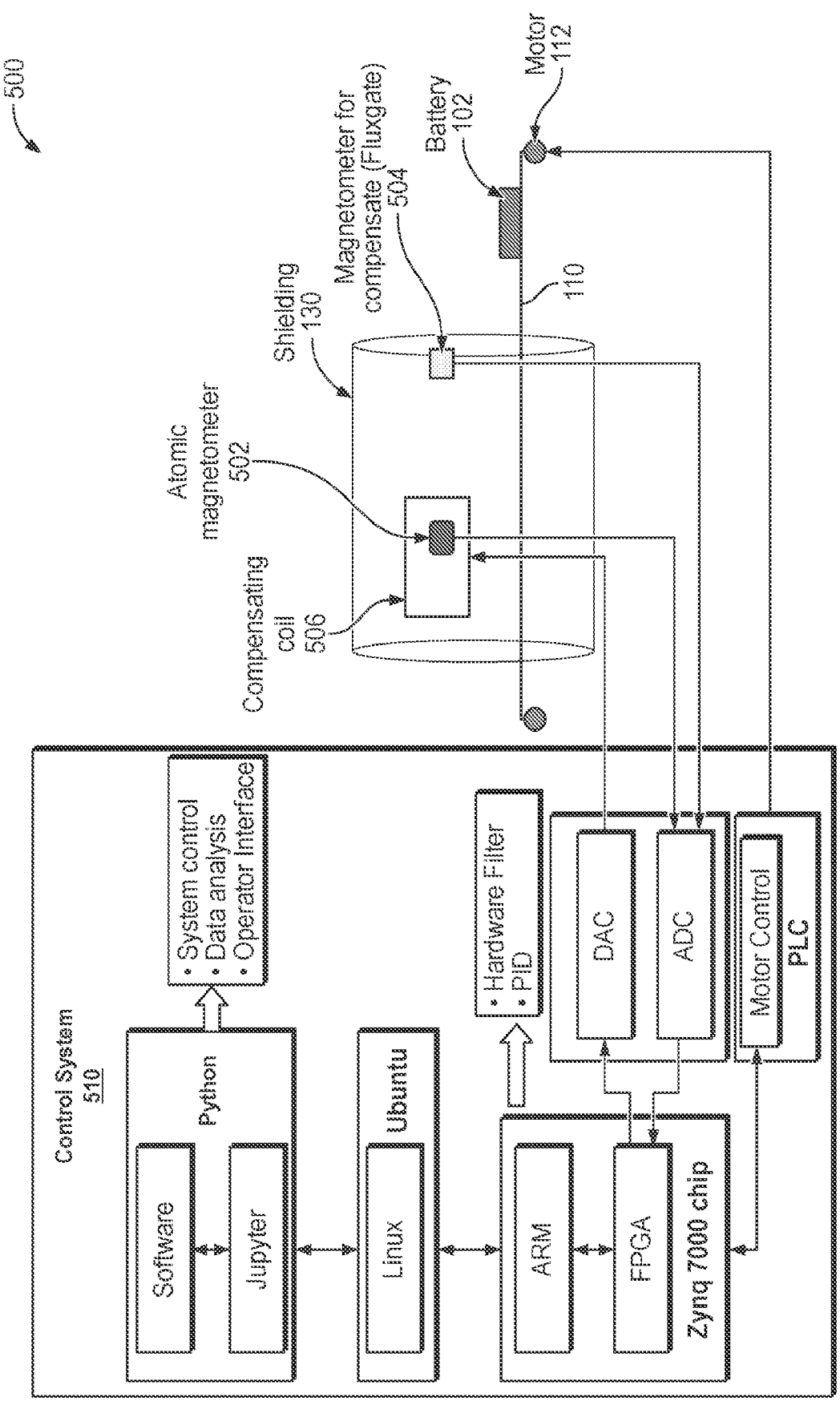
FIG. 5 illustrates a system for magnetic susceptibility measurements (magnetic susceptometry) that can accommodate devices that have a large permanent magnetization, according to an embodiment.

FIG. 5 illustrates a system 500 for magnetic susceptibility measurements (magnetic susceptometry) that can accommodate devices (e.g., a battery 102) that have a large permanent magnetization. Devices that have a large permanent magnetization can cause the one or more sensors 106 (e.g., sensitive magnetometers) to go out of range. The system 500 can combine different types of magnetic sensors to include an active feed-forward compensation system. The system 500 can include the conveyor belt 110, the motor 112, a device (e.g., the battery 102), the magnetic shield 130 and the one or more sensors 106. The one or more sensors 106 can include an atomic magnetometer 502. The one or more sensors 106 can include a large dynamic range sensor 504 (e.g., a fluxgate sensor or a magnetometer for compensate). The large dynamic range sensor 504 can measure a magnetic field profile of the device while there is no background magnetic field. The conveyor belt 110 can move the battery 102 past the large dynamic range sensor 504. The large dynamic range sensor 504 can measure a magnetic field profile of the battery 102 while there is no background magnetic field. The magnetic field profile can be an input into a background magnetic field compensation of the atomic magnetometer 502. The magnetic field profile can be an input as the battery 102 moves past the atomic magnetometer 502. The magnetic field profile can be an input while the solenoid 104 or compensating coil 506 generates a magnetic field. The control system 510 can process data generated from the one or more sensors 106. For example, the control system 510 can process data generated from the atomic magnetometer 502 and the large dynamic range sensor 504. The control system 510 can effectively zero the magnetization and cause the one or more sensors 106 to only measure the induced magnetic field.

Experimental Setup

In some embodiments, measurements were performed on pouch cells (Powerstream PGEBNMU53040) (e.g., batteries 102) with dimensions of approximately 3×4×0.5 cm$^3$. The magnetic susceptibility behavior of the pouch cell is similar to the magnetic susceptibility for LCO (Li$_x$CoO$_2$) material, which is common for cell-phone batteries. With no applied field in the solenoid 104, the disconnected battery 102 had less than 10 pT residual field due to slight magnetization in the y-direction. Measurements were performed inside of a magnetic shield 130 (e.g., Twinleaf MS-2), operated without end-caps. The magnetic shield 130 has four cylindrical layers of shielding material. Without endcaps and compensation fields applied, the magnetic-field on top and below the center of the solenoid 104 within the magnetic shield 130 region was less than 10 pT. This value was well within acceptable background levels in order to facilitate susceptibility measurements. Taking measurements within a shield without endcaps reduces baseline noise in the magnetometer to ~40 pT/√Hz, in the x-direction and ~200 pT/√Hz in the z-direction, with a sensor bandwidth of DC-100 Hz. Monitoring the background fields using a fluxgate magnetometer can reduce the influence of artifacts and long-term drifts resulting from external signals (e.g., other lab equipment).

In some embodiments, measurements were performed on Li-ion pouch cells (Powerstream PGEBNMU53040) (e.g., batteries 102) with dimensions of approximately 2.9×3.9× 0.7 cm3. Each cell has 12 pairs of active electrodes arranged in a flattened jelly roll configuration. The anode consists of graphite on a copper current collector and the cathode consists of nickel manganese cobalt oxide on an aluminum current collector. Energy-dispersive X-ray spectroscopy of the cathode materials revealed the composition as 44.25% Co, 33.20% O, 3.11% Mn, 13.95% C, 5.04% Ni, 0.1% Ti and 0.24% P in weight percentage. The separator material is polyolefin. The magnetic field around each battery with the solenoid off was measured to be less than 20 pT in any direction before performing experiments. This field (due to remnant magnetization) was mapped for each cell with the solenoid field off and subtracted from the induced field maps.

In some embodiments, the coil was fabricated with 3560 turns of 0.56 mm diameter wire and uniform spacing on a 1 m long aluminum mount. A current of 3 mA is run through the coil to produce a field of $2 \cdot 10^{-5}$ T at the center of the coil. The one or more sensors 106 can include a first sensor and a second sensor. The first sensor of the one or more sensors 106 is placed 2 cm above the center of the solenoid 104. The second sensor of the one or more sensors 106 is placed 2 cm below the center of the solenoid 104. To measure the discharge behavior of the cell, the cell was discharged by drawing 2-3 mA of current for 30 seconds at a time. Once the circuit was interrupted, magnetic field measurements were performed within a subsequent period of 30 seconds. The measurements can include long-term discharging measurements.

In some embodiments, measurements were performed inside a Twinleaf MS-2 magnetic shield, operated with end-caps removed. The magnetic shield had four cylindrical layers of mu-metal shielding material with the innermost shield diameter of 180 mm and the outermost shield diameter of 304.5 mm. The overall length of the outermost shield was 620 mm. At the center of the shield cylinders, the laboratory magnetic fields were reduced by a factor of $10^4$ in the direction parallel to the cylinder axis, and $10^5$ in the transverse direction.

With end-caps removed and compensation fields applied, the magnetic-field on top and below the center of the solenoid within the magnetic shield region was measured to be below 10 pT. Acquiring measurements within an open shield reduces baseline noise in the magnetometer to environmental noise dominated ~40 pT/√Hz in the x-direction and ~200 pT/√Hz in the z-direction (larger due to open cylinder arrangement), within the sensor bandwidth of DC to 150 Hz. The measurement can be susceptible to large transient magnetic artifacts and long-term drifts resulting from other equipment in the laboratory or in the building, therefore the background fields were monitored using a fluxgate magnetometer to ensure that measurements were not taken during large background-field fluctuations.

In some embodiments, the coil was fabricated with 3560 turns of 0.56 mm diameter wire and uniform spacing on a 1 m long aluminum mount. A current of 3 mA was fed through the coil to produce a field of $2 \cdot 10^{-5}$ T at the center of the coil, measured using a small-sized fluxgate sensor. Two QuSpin zero-field rubidium-vapor spin-exchange relaxation free (SERF) magnetometers (Generation 1) were used. Each sensor was placed 2 cm above or below the center of the solenoid. Only the data from a single sensor is required for all the measurements shown in this work, and the second sensor was included for redundancy.

To measure the discharge behavior of the cell, it was discharged by drawing 2-3 mA of current over a 1 kΩ, resistor for 30 min at a time. The cell was subsequently disconnected from the resistor for a further 30 min. During this rest period, the magnetic field at a single point above the battery was measured continuously. The position of the sensor for these measurements was determined by choosing a maximum point in the magnetic field map (upper left corner of the battery in FIG. 1C). An analog input channel of a DAQ was connected to the circuit during both discharging and rest conditions. This discharge and rest cycle were repeated over 24 hours. During this periodic discharge measurement, the solenoid field was on, so that susceptibility changes could be monitored. The same measurement performed with the solenoid field off yielded no induced field in the cell, and the relaxation time constants for internal currents were determined to be similar as when the solenoid field was turned on. The discharge capacity of the battery at each point was determined by taking the average current measured in the discharge circuit during a discharge period, multiplied by the discharge time.

The cell was transported through the solenoid region and past the sensors using a conveyor belt made of vinyl tape, chosen for its low-friction backing and its non-magnetic properties. The belt was moved via servo motors that were placed outside the shielded region. Each servo motor was mounted on a translation stage (Thorlabs KMTS50E/M). This arrangement allowed the entire belt to move in the x-direction with 0.1 mm precision, enabling scanning measurements of the batteries. The sensors measured the x and z magnetic-field components in a plane parallel to the battery.

The QuSpin electronics provide dedicated analog voltage output channels corresponding to the measured magnetic field in the x- or z-directions. These voltages were measured using a National Instruments DAQ (NI-9205). The motion of the conveyor belt was controlled via a custom Python program that sequentially moved the belt forward by approximately 40 cm and was then reset to the original longitudinal position while the translation stages laterally moved the belt by 0.5 mm for the next scan. The data acquisition was triggered by a mechanical switch that was tripped at the end of the conveyor belt reset movement. Each map took approximately 15 min to acquire, limited by the speed of the motors used, and was obtained using an average of six runs. The magnetic field data was filtered for line noise and harmonics and smoothed using a 20-point window.

The spatial resolution of the magnetic field at the sensor may be limited by the size of the probe laser beam within the atomic magnetometer and is estimated to be a voxel of approximately 2×2×2 mm³. The temporal resolution for the sensor is 150 Hz. For measurements of internal currents within the battery, the cell was positioned directly below the sample and data was taken continuously at a 1 kHz acquisition rate. The frequency response of the sensor, however, attenuates signals above 150 Hz.

In some embodiments, regularized magnetic field inversion was performed using a dipolar field kernel and a truncated singular value decomposition. The volume magnetic susceptibility distribution was obtained as an average value across the thickness of the cell (y-direction). Singular values of the dipolar kernel transformation matrix were truncated below a value of $5 \times 10^{-7}$ T to achieve regularization and stability of the inversion. The resolution of the susceptibility map is estimated to be about 5 mm.

Figure 6:
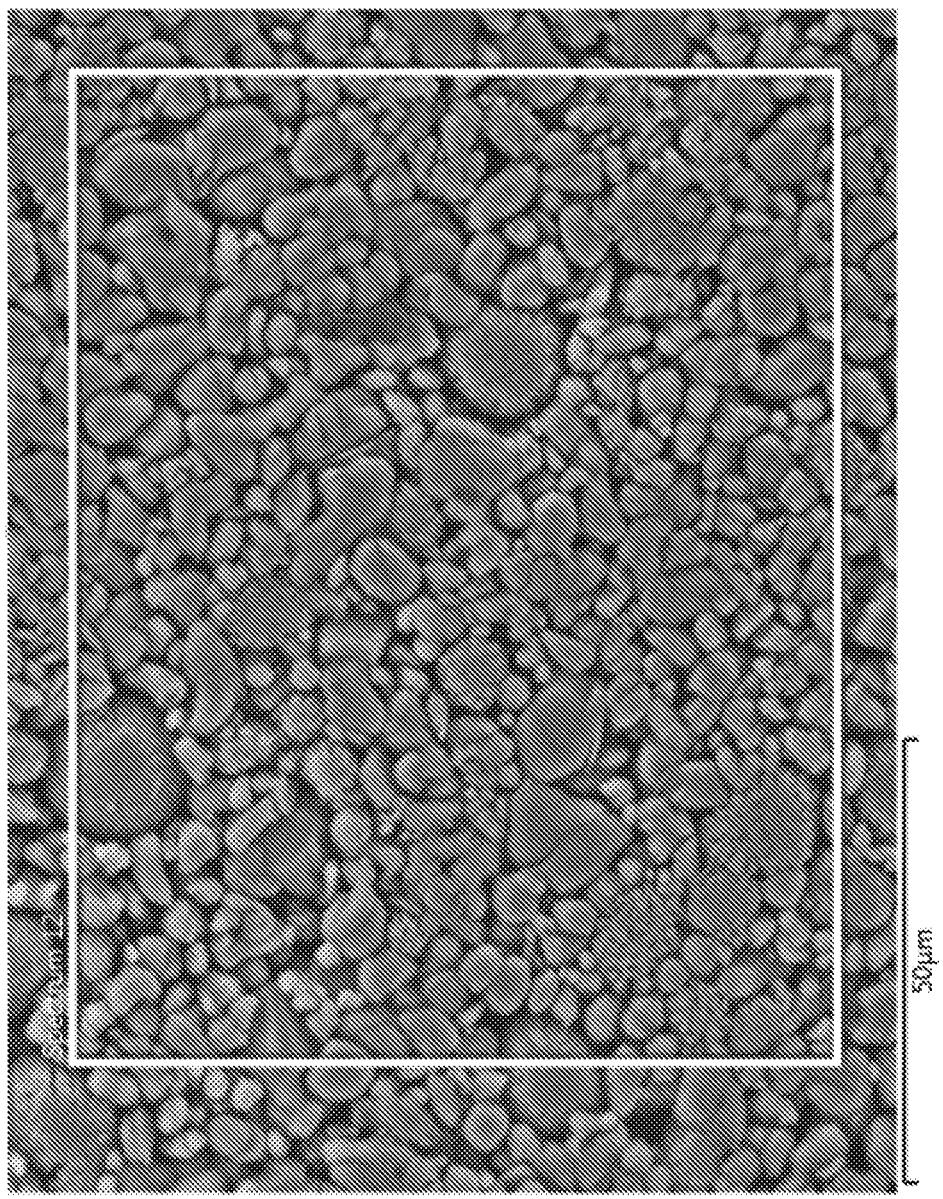
FIG. 6 illustrates a scanning electron microscope (SEM) image of a cathode, according to an embodiment.

FIG. 6 illustrates a scanning electron microscope (SEM) image of a cathode. The cathode is a Powerstream PGEBNMU53040 Cathode.

Figure 7:
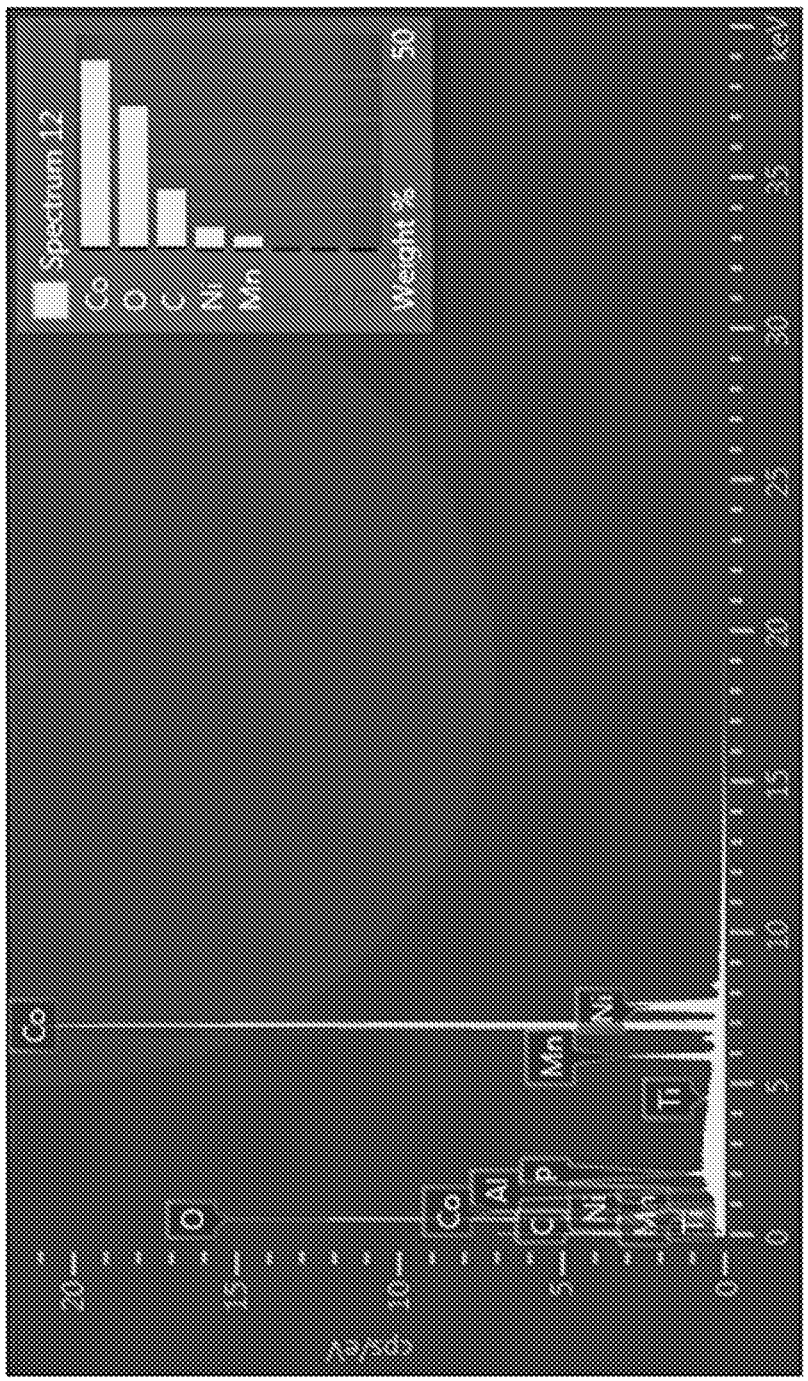
FIG. 7 illustrates an energy-dispersive X-ray microanalysis spectrum of a cathode, according to an embodiment.

FIG. 7 illustrates an energy-dispersive X-ray microanalysis spectrum of a cathode. The cathode is a Powerstream PGEBNMU53040 Cathode. The analysis was conducted using a MERLIN (Carl Zeiss) field emission scanning electron microscope (FESEM) with an Oxford Instruments EDS setup. The EDS data was collected with EHT (electron high tension) at 20-24 kV of energy using 1.2-2 nA of probe current.

FIGS. 8A-8B illustrate results of fitting battery voltage measurements in a relaxation period immediately following disconnection from a discharge resistor. Voltage was fit to the double exponential function, $V(t)=A_1 e^{t/t_1}+A_2 e^{t/t_2}+c$, where $A_1$, $A_2$ are the fit amplitudes, $t_1$, $t_2$ are the exponential time constants, and c is a constant offset. FIG. 8A shows a comparison of the fit amplitudes. The comparison can establish the dominant effect in the healthy (depth of discharge <600 mAh) or overdischarge (depth of discharge >600 mAh, grey background) regimes. That the fit amplitude, $A_2$ is relatively constant over the measurement indicates that this is likely attributable to the influence of the connected measurement circuitry. The amplitude $A_1$ becomes larger in the overdischarge regime, indicating that the effects of weak transient internal battery currents are becoming more visible. FIG. 8B shows a comparison of the time constants for the two exponential components. The comparison shows that fitting the voltage in the healthy regime is susceptible to large uncertainties, almost an order of magnitude larger than those from fitting the magnetic data. These uncertainties make it difficult to extract internal dynamics reliably, which is affected by the influence of the circuitry.

Figure 9A:
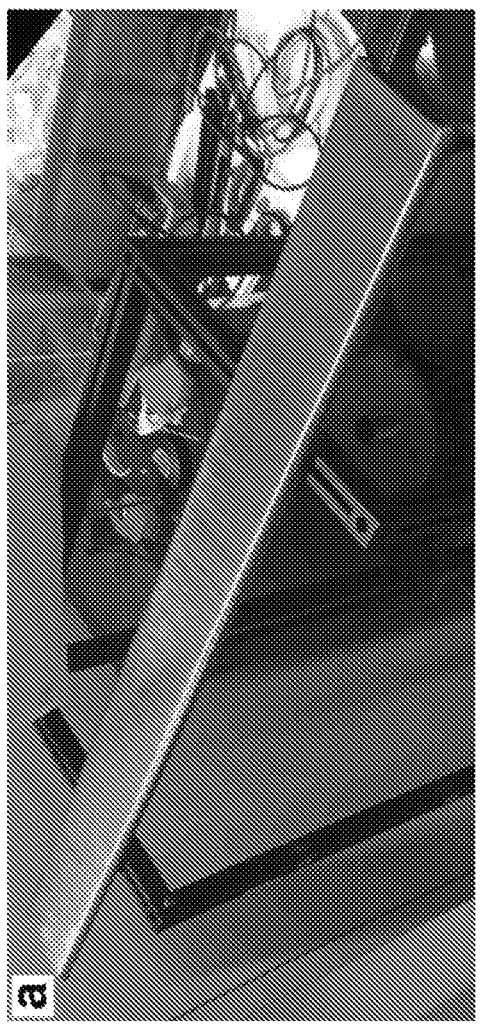
FIG. 9A illustrates a solenoid, according to an embodiment.
Figure 9B:
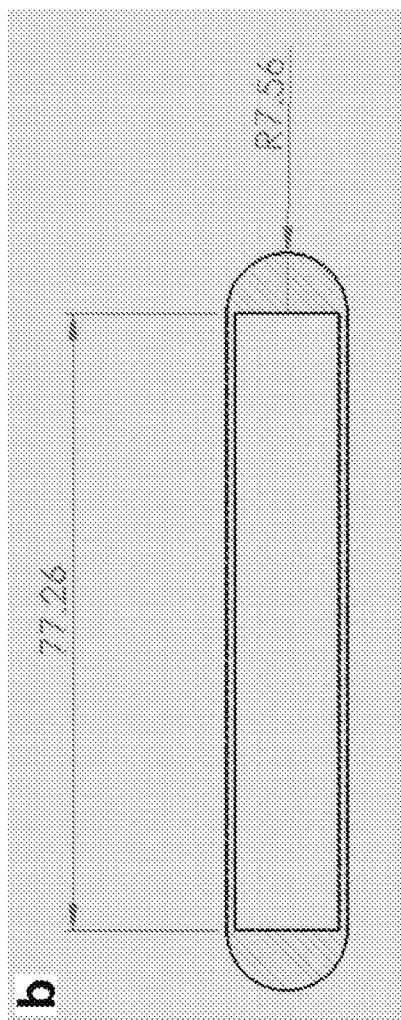
FIG. 9B illustrates a cross-section of an aluminum mount, according to an embodiment.

FIG. 9A illustrates a solenoid. The measured parameters for the coil were: inductance L=15.87 mH, capacitance C=15696 nF, resistance R=61.8Ω. FIG. 9B illustrates a cross-section of an aluminum mount around which the solenoid wire was wound. Cross section of aluminum mount around which the solenoid wire was wound. The radius of the rounded sides, r=h/2=7.56 mm, where h is the height of the cross section.

Figure 10:
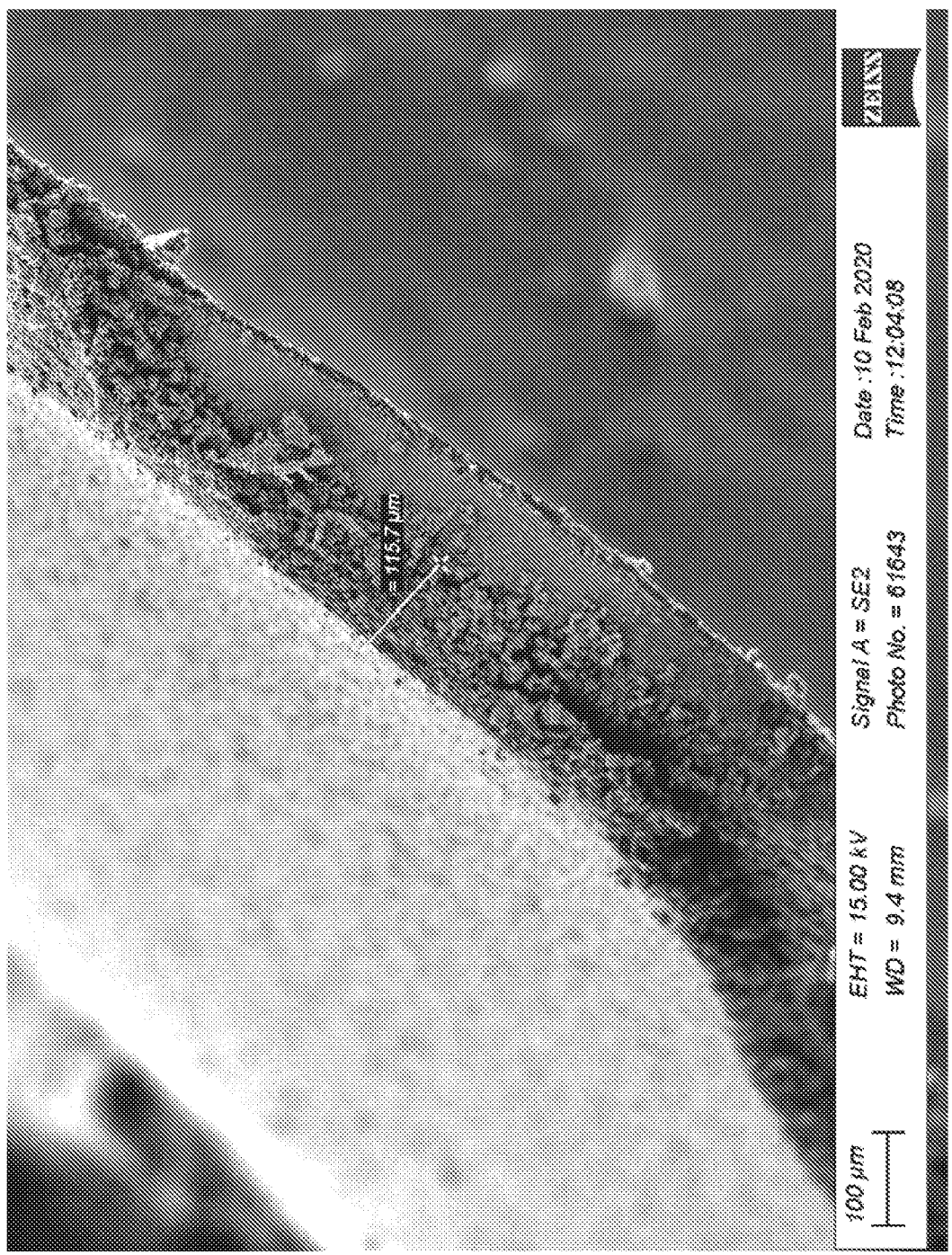
FIG. 10 illustrates an SEM image of battery cathode showing the active material layer on an aluminum current collector, according to an embodiment.
Figure 11:
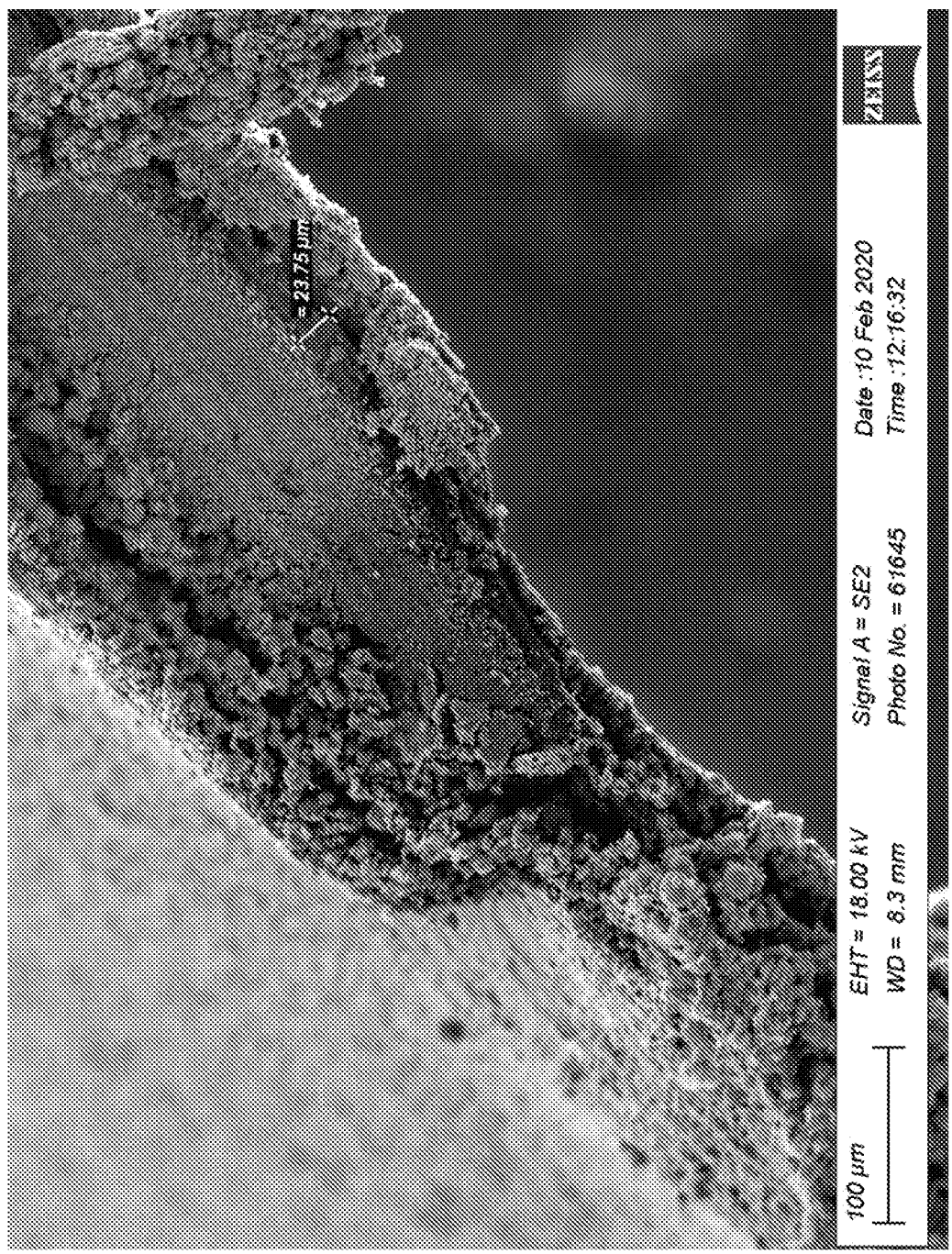
FIG. 11 illustrates an SEM image of battery cathode with active material on an aluminum current collector, according to an embodiment.
Figure 12:
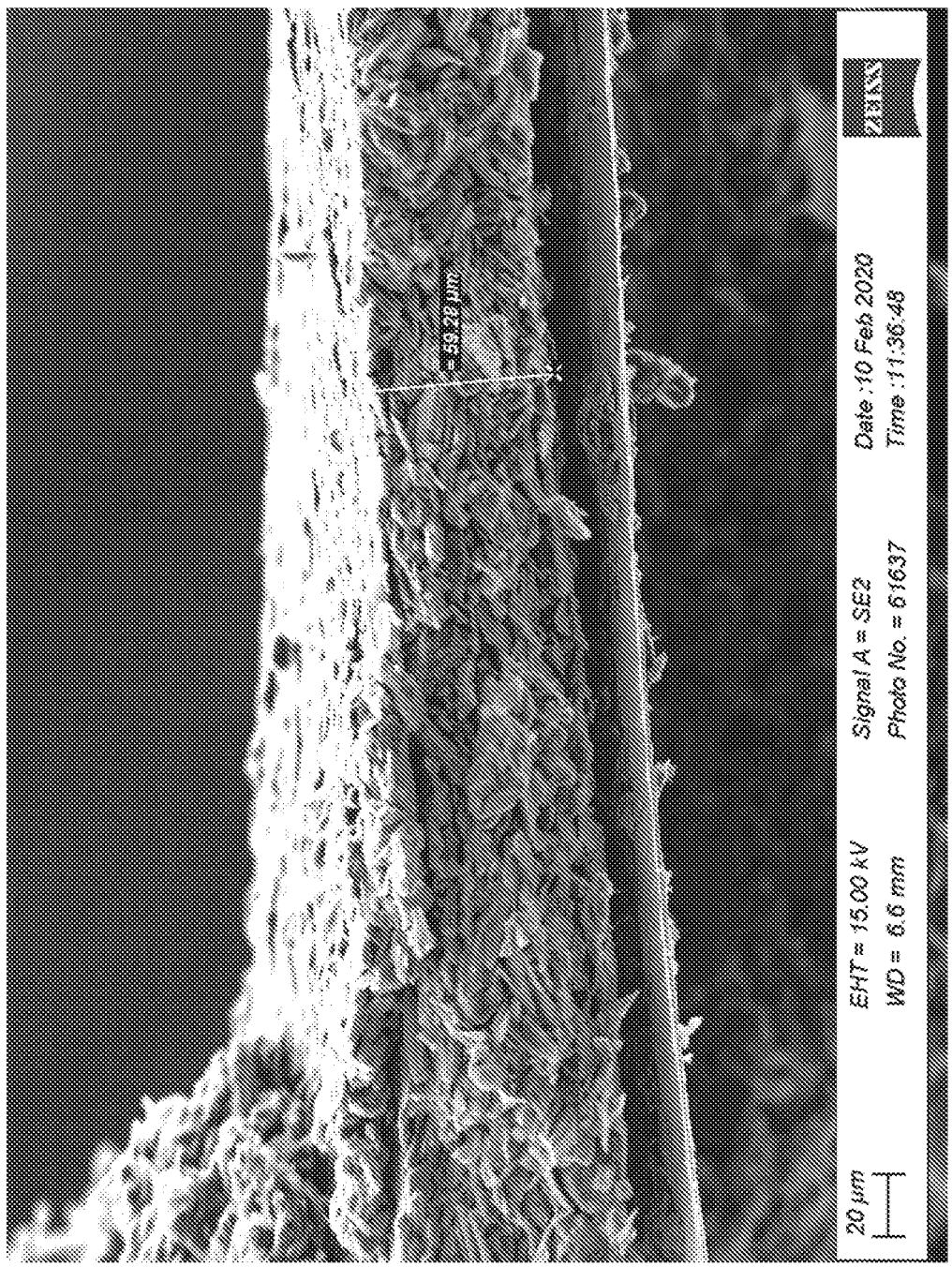
FIG. 12 illustrates an SEM image of battery anode showing graphite on a copper current collector, according to an embodiment.

FIG. 10 illustrates an SEM image of battery cathode showing the active material layer on an aluminum current collector. The aluminum current collector thickness was determined as 115.7 μm. FIG. 11 illustrates an SEM image of battery cathode with active material on an aluminum current collector. The aluminum thickness was determined as 23.8 μm. FIG. 12 illustrates an SEM image of battery anode showing graphite on a copper current collector. The graphite thickness was determined as 59.3 μm.

Figure 13:
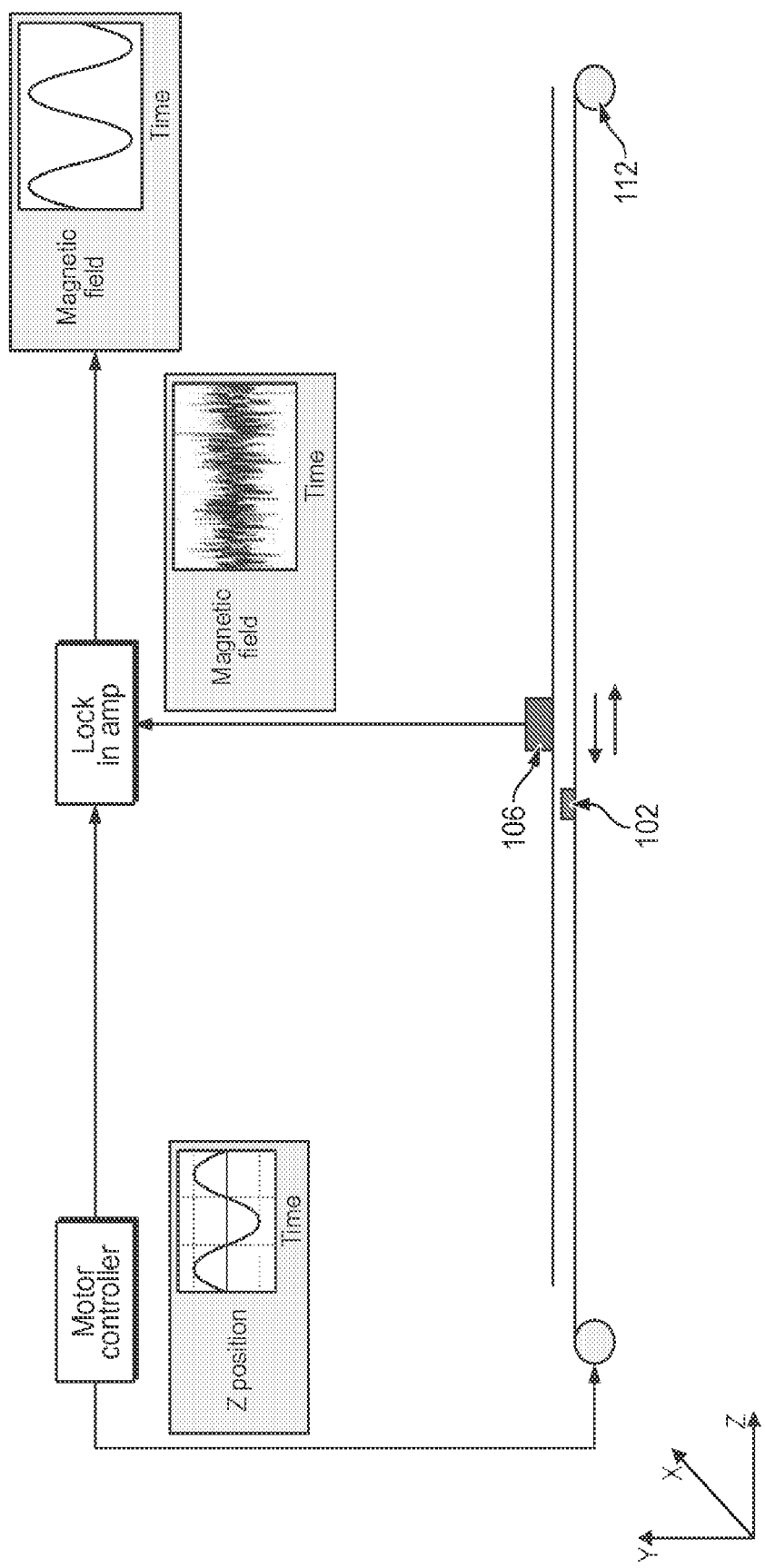
FIG. 13 illustrates a system for magnetic susceptibility measurements, according to an embodiment.

FIG. 13 illustrates a system for magnetic susceptibility measurements. The measurements could be performed while the battery 102, sample, or device is being moved forward and backward at a fixed frequency relative to the sensor 106 or sensor array. A lock-in detection mode, locked with the frequency of the motion can reduce noise and increase sensitivity and speed of measurement.

In some embodiments, measurements of alternating induced magnetic fields in response to an alternating background magnetic field includes magnetic sensors (e.g., magnetic field sensors. The measurements can include a solenoid and a magnetic shield. When applying an alternating magnetic field by applying an alternating current through the solenoid coil, the response of the magnetization in the sample or the battery to the alternating magnetic field can be measured through the magnetic field sensors. By implementing a lock-in detection mode, a high sensitivity can be achieved, which would allow the magnetic field measurements to be performed in noisy environments. This approach may also reduce the need for high quality magnetic shielding. The alternating magnetic field measurement could be performed, for example, at frequencies ranging from 0.1 Hz to 1 MHz. The determination of the magnetic susceptibility and the magnetic properties over this frequency range can allow for the detection of important materials and device parameters. In addition, the spatially-resolved application of this technique can allow for the determination of the distribution of the frequency-dependent magnetic properties across a sample or device. Such properties could be indicative of the quality of devices, and could be diagnostic of certain failure modes.

In some embodiments, the sensitivity of the magnetic sensors could be further increased by applying an alternating magnetic field locally to the magnetic field sensors. This procedure, along with lock-in detection could allow for the decoupling of background noise from the magnetic field measurements.

In some embodiments, measurement of alternating magnetic fields can be in response to applying alternating currents to battery cells or devices. The measurement could allow for the determination of the distribution of alternating current flow across a device or sample. In combination with lock-in detection, the measurement could further allow for the determination of both the spatially resolved amplitude and phase of the magnetic field distribution. These measurements, combined with magnetic field inversion calculation, could allow for the determination of information similar to electrical impedance spectroscopy, but with a high spatial resolution. In addition, this approach could be particularly useful to study the behavior of electrochemical storage devices during fast charging and pulsed-charging modes, as well as in cyclic discharge regimes.

In some embodiments, the magnetism probed can be based on intrinsic or induced paramagnetism, ferromagnetism, diamagnetism, ferrimagnetism, or related phenomena.

In some embodiments, the measurements could be performed while a battery or a device is being subjected to special charging or discharging regimes (e.g. pulse charging modes). In addition, battery or device behavior could be studied by examining the charge and discharge properties during preheating or precooling the devices.

In some embodiments, the setup could help to measure the time required for electrochemical reaction during charging and discharging, by measuring the magnetic field generated by the electrochemical reaction inside the battery. This can be important for estimating the charging speed in ultrafast charging and discharging battery.

In some embodiments, the measurements could be performed to determine the amount of magnetic impurities in battery cells, materials, or devices. The impurities could exhibit certain types of magnetism, such as ferromagnetic, ferrimagnetic, paramagnetic, antiferromagnetic, or diamagnetic behavior. For example, iron is a common impurity component of commercial rechargeable battery cells. The amount and type of impurity could be determined by the magnetic measurements described herein.

In some embodiments, the measurements could be performed by studying the induced or intrinsic magnetic properties of the batteries, samples, or materials at different background magnetic fields. For example, the measurements can be performed by changing the magnetic field applied to the solenoid, or by using a dedicated additional magnetic field coil or permanent magnet arrangement. In doing so, the magnetic properties as a function of the background field and the hysteresis properties of the device or the material can be determined. This procedure could allow for the distinguishing between different types of magnetic properties (e.g. ferrimagnetism from paramagnetism), and would allow for the detection of properties including impurity amounts, grain, or domain sizes.

In some embodiments, the measurements could be performed by pre-magnetizing the battery, device, or material before the measurement using a strong magnet. This approach could allow for the determination of intrinsic magnetic properties such as, for example, the influence of ferromagnetic or ferrimagnetic behavior.

In some embodiments, the measurements could be performed by degaussing the battery, device, or material before the measurement using, for example, an alternating magnetic field which is slowly reduced to zero. This procedure could demagnetize magnetic materials and could support the distinction between different magnetic behaviors in the battery, device, or materials under study.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

Figure 14:
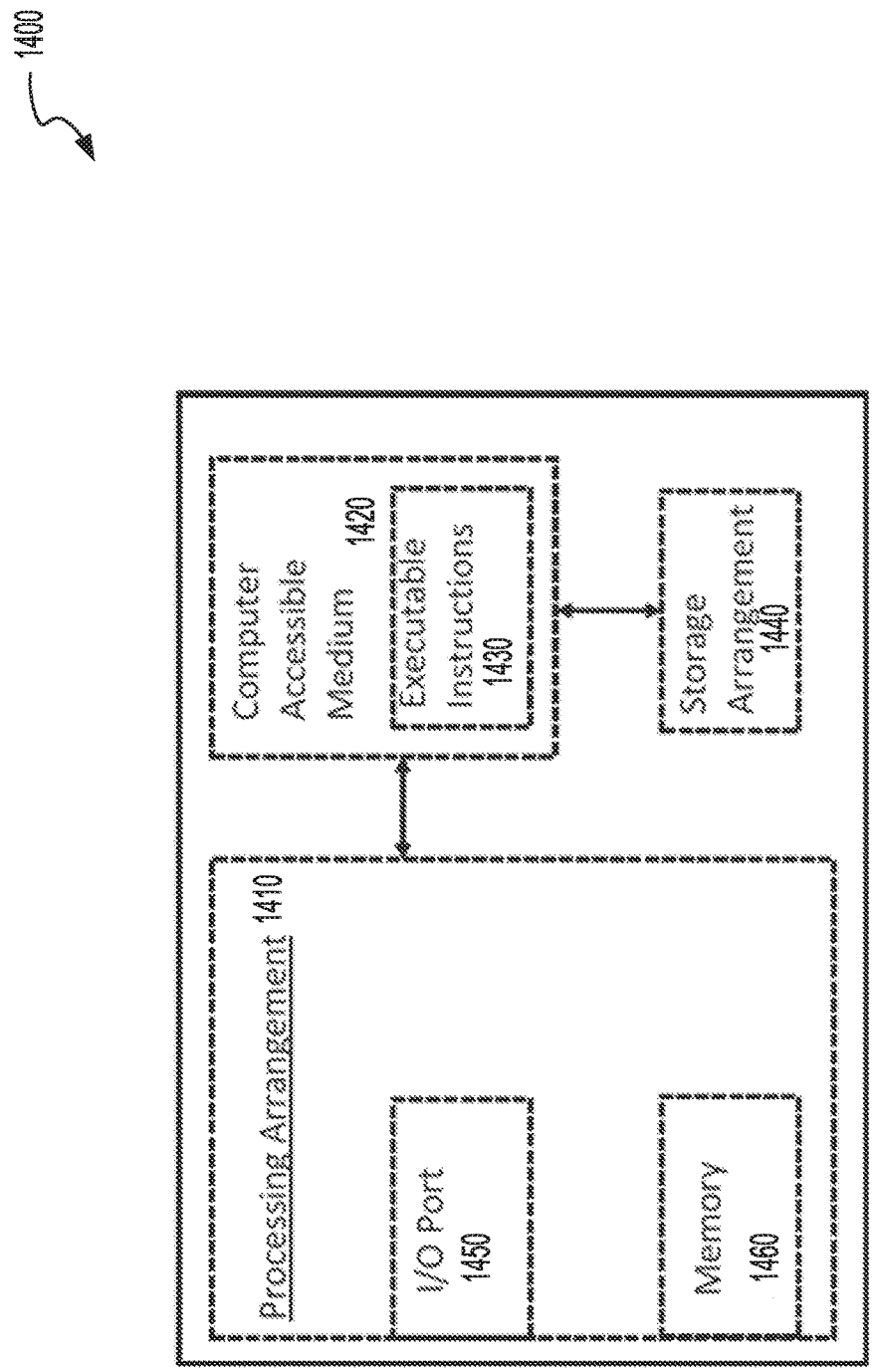
FIG. 14 illustrates a computer system for implementing an embodiment of the methods described herein.

As shown in FIG. 14, e.g., a computer-accessible medium 1420 (e.g., as described herein, a storage device such as a hard disk, floppy disk, memory stick, CD-ROM, RAM, ROM, etc., or a collection thereof) can be provided (e.g., in communication with the processing arrangement 1410). The computer-accessible medium 1420 may be a non-transitory computer-accessible medium. The computer-accessible medium 1420 can contain executable instructions 1430 thereon. In addition or alternatively, a storage arrangement 1440 can be provided separately from the computer-accessible medium 1420, which can provide the instructions to the processing arrangement 1410 so as to configure the processing arrangement to execute certain exemplary procedures, processes and methods, as described herein, for example. The instructions may include a plurality of sets of instructions. For example, in some implementations, the instructions may include instructions for applying radio frequency energy in a plurality of sequence blocks to a volume, where each of the sequence blocks includes at least a first stage. The instructions may further include instructions for repeating the first stage successively until magnetization at a beginning of each of the sequence blocks is stable, instructions for concatenating a plurality of imaging segments, which correspond to the plurality of sequence blocks, into a single continuous imaging segment, and instructions for encoding at least one relaxation parameter into the single continuous imaging segment. The processing arrangement 1410 can include an I/O port 1450. The processing arrangement 1410 can include memory 1460.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Thus, particular implementations of the invention have been described.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. Therefore, the above embodiments should not be taken as limiting the scope of the invention.

What is claimed is:

1. A method of diagnosing internal characteristics of a battery, comprising:
   applying a strong magnetic field to the battery, the battery disposed inside of a solenoid having a flat upper portion and a flat lower portion, the solenoid disposed inside a magnetic shield;
   reducing the strong magnetic field at a location of one or more sensors, wherein at least one of the one or more sensors is proximate to the battery, disposed outside of the solenoid, and disposed inside of the magnetic shield;
   measuring magnetic field components in an x-direction, y-direction, and a z-direction of induced magnetic fields around the battery; and
   using the measured magnetic field components to identify and spatially localize defects in the battery.

2. The method of claim 1, further comprising:
   correlating the induced magnetic fields around the battery with a state of charge of the battery.

3. The method of claim 1, wherein measuring the induced magnetic fields around the battery comprises performing at least one of in situ measurements or operando measurements.

4. The method of claim 1, further comprising:
   measuring internal electric currents of the battery.

5. The method of claim 1, further comprising:
   fitting the induced magnetic fields around the battery to a magnetic field model.

6. The method of claim 5, wherein the magnetic field model is based on at least one of an electrical current distribution, a magnetic susceptibility distribution, or a distribution of magnetic impurities.

7. The method of claim 1, further comprising:
   mapping magnetic susceptibility within the battery.

8. A method of diagnosing internal characteristics of a battery, comprising:
   applying a strong magnetic field to the battery, the battery disposed inside of a solenoid having a flat upper portion and a flat lower portion, the solenoid disposed inside a magnetic shield;
   measuring, by one or more sensors disposed proximate to the battery, outside of the solenoid, and inside of the magnetic shield, magnetic field components in an x-direction, y-direction, and a z-direction of induced magnetic fields around the battery; and
   generating, using the measured magnetic field components, a magnetic field map comprising a spatial distribution of one or more charged elements within the battery.

9. The method of claim 8, further comprising:
   applying alternating currents to the battery.

10. The method of claim 1, wherein the one or more sensors comprise one or more magnetometer sensors.

11. The method of claim 1, further comprising:
    detecting changes in magnetic susceptibility distributions in the battery.

12. The method of claim 1, wherein the induced magnetic fields are produced by electrical currents from the battery.

13. The method of claim 8, wherein the induced magnetic fields are produced by electrical currents from the battery.

14. The method of claim 8, wherein the battery is positioned on a conveyor belt.

15. The method of claim 1, further comprising:
    determining a spatial distribution and inhomogeneity of charge storage mechanisms.

16. The method of claim 1, wherein measuring magnetic field components in an x-direction, y-direction, and a z-direction of the induced magnetic fields around the battery comprises:
    measuring an x-component of the induced magnetic fields around the battery;
    measuring a y-component of the induced magnetic fields around the battery; and
    measuring a z-component of the induced magnetic fields around the battery.

17. The method of claim 1, wherein a cross-section of the solenoid perpendicular to a longitudinal axis of the solenoid has a obround shape.

18. The method of claim 1, wherein a distance between an upper surface of the magnetic shield and the flat upper portion of the solenoid is greater than a distance between a side surface of the magnetic shield and a side portion of the solenoid.

19. The method of claim 1, wherein the one or more sensors have a sensitivity of 10 $pT\sqrt{Hz}$.

20. The method of claim 1, comprising:
    determining, based on the induced magnetic fields, an amount of magnetic impurities in the battery.

* * * * *